US012481367B2

(12) United States Patent
Kamiyama

(10) Patent No.: US 12,481,367 B2
(45) Date of Patent: Nov. 25, 2025

(54) TRIGGER SIGNAL GENERATING APPARATUS AND PORTABLE TERMINAL

(71) Applicant: pop Inc., Tokyo (JP)

(72) Inventor: Yoshinori Kamiyama, Tokyo (JP)

(73) Assignee: pop Inc., Tokyo (JP)

( * ) Notice: Subject to any disclaimer, the term of this patent is extended or adjusted under 35 U.S.C. 154(b) by 0 days.

(21) Appl. No.: 17/419,656

(22) PCT Filed: Jun. 28, 2021

(86) PCT No.: PCT/JP2021/024315
§ 371 (c)(1),
(2) Date: Jun. 29, 2021

(87) PCT Pub. No.: WO2023/275920
PCT Pub. Date: Jan. 5, 2023

(65) Prior Publication Data
US 2024/0220022 A1   Jul. 4, 2024

(51) Int. Cl.
*G06F 3/01*     (2006.01)
*G06F 3/0346*   (2013.01)
*H04N 23/63*    (2023.01)

(52) U.S. Cl.
CPC ............ *G06F 3/017* (2013.01); *G06F 3/0346* (2013.01); *H04N 23/633* (2023.01)

(58) Field of Classification Search
CPC ...... H04N 23/633; H04N 23/60; H04N 23/63; H04N 23/66; G06F 3/017; G06F 3/0346; G06F 3/01
See application file for complete search history.

(56) References Cited

U.S. PATENT DOCUMENTS

| 11,983,461 | B2* | 5/2024  | Fortier  | G06V 10/764 |
| 2018/0041692 | A1* | 2/2018  | Qin      | H04N 23/6812 |
| 2020/0356221 | A1* | 11/2020 | Behzadi  | H04L 67/04 |
| 2021/0397815 | A1* | 12/2021 | Alameh   | G06F 3/017 |
| 2022/0345591 | A1* | 10/2022 | Shau     | H04N 23/55 |
| 2023/0222742 | A1* | 7/2023  | Kawano   | G06T 19/006 |
|  |  |  |  | 345/633 |

FOREIGN PATENT DOCUMENTS

JP          6142060 B1       6/2017
WO    WO-2018/066705 A1     4/2018

* cited by examiner

*Primary Examiner* — Kelly L Jerabek

(74) *Attorney, Agent, or Firm* — Alston & Bird LLP

(57) ABSTRACT

A trigger signal generating apparatus according to an aspect of the present invention for generating a trigger signal indicating a timing when a gesture is performed on a portable terminal, the trigger signal generating apparatus includes a motion information detecting unit for detecting motion information in each of three axial directions of a coordinate system having the portable terminal as an origin, and a trigger signal generating unit for generating the trigger signal at a timing when a positive/negative sign of one of three pieces of motion information detected by the motion information detecting unit becomes different from the remaining two positive/negative signs.

11 Claims, 32 Drawing Sheets

TRIGGER SIGNAL GENERATING APPARATUS AND PORTABLE TERMINAL

CROSS-REFERENCE TO RELATED APPLICATIONS

This application is a national stage entry of PCT/JP2021/024315 filed Jun. 28, 2021, which is hereby incorporated by reference.

TECHNICAL FIELD

The present invention relates to a trigger signal generating apparatus and a portable terminal.

BACKGROUND ART

Conventionally, a technique for operating an imaging apparatus by moving a smartphone in a predetermined pattern has been disclosed. Specifically, in the technique of Patent Document 1, when the user detects a series of movements of swinging up the smartphone counterclockwise, swinging down the smartphone clockwise, and stopping the smartphone, the imaging device mounted on the smartphone is operated.

Patent Document 2 discloses a technique for reproducing, stopping, fast-forwarding, rewinding, and the like of a moving image by moving a smartphone in a predetermined pattern. Specifically, in the technique of Patent Document 2, a user detects an operation of tilting a smartphone around an x-axis or a y-axis, and performs playback, stop, and the like of a moving image based on the detected operation content.

CITATION LIST

Patent Literature

PTL1: Japanese Patent No. 61420609
PTL2: PCT International Publication No. WO 2018/66705

SUMMARY OF THE INVENTION

Technical Problems

The present invention solves the problems of the prior art.

Solution To The Problems

A first aspect of the present invention, as a trigger signal generating apparatus for generating a trigger signal indicating a timing when a gesture is performed on a portable terminal, includes a motion information detecting unit for detecting motion information in each of three axial directions of a coordinate system having the portable terminal as an origin, and a trigger signal generating unit for generating the trigger signal at a timing when a positive/negative sign of one of three pieces of motion information detected by the motion information detecting unit becomes different from the remaining two positive/negative signs.

A second aspect of the present invention as a portable terminal includes an image capture unit for capturing a subject and generating frame images, an image storage unit for sequentially storing the frame images generated by the image capture unit, a still period detection unit for detecting a still period when the portable terminal is in a still state based on three pieces of motion information detected by the motion information detection unit, a motion information detection unit for detecting motion information in three axial directions of a coordinate system respectively, a trigger signal generation unit for generating a trigger signal indicating a timing at which a gesture is performed when a positive/negative sign of one of the three pieces of motion information detected by the motion information detection unit becomes different from the remaining two positive/negative signs, and a still image selection unit for selecting, as a still image, one frame image corresponding to the still period detected by the still period detection unit before or after a timing when the trigger signal is generated, from a plurality of frame images stored in the image storage unit.

Effect Of The Invention

According to the present invention, the user can operate the portable terminal only by performing simple gestures on the portable terminal.

DESCRIPTION OF EMBODIMENTS

Hereinafter, embodiments of the present invention will be described in detail with reference to the drawings.

Figure 1:
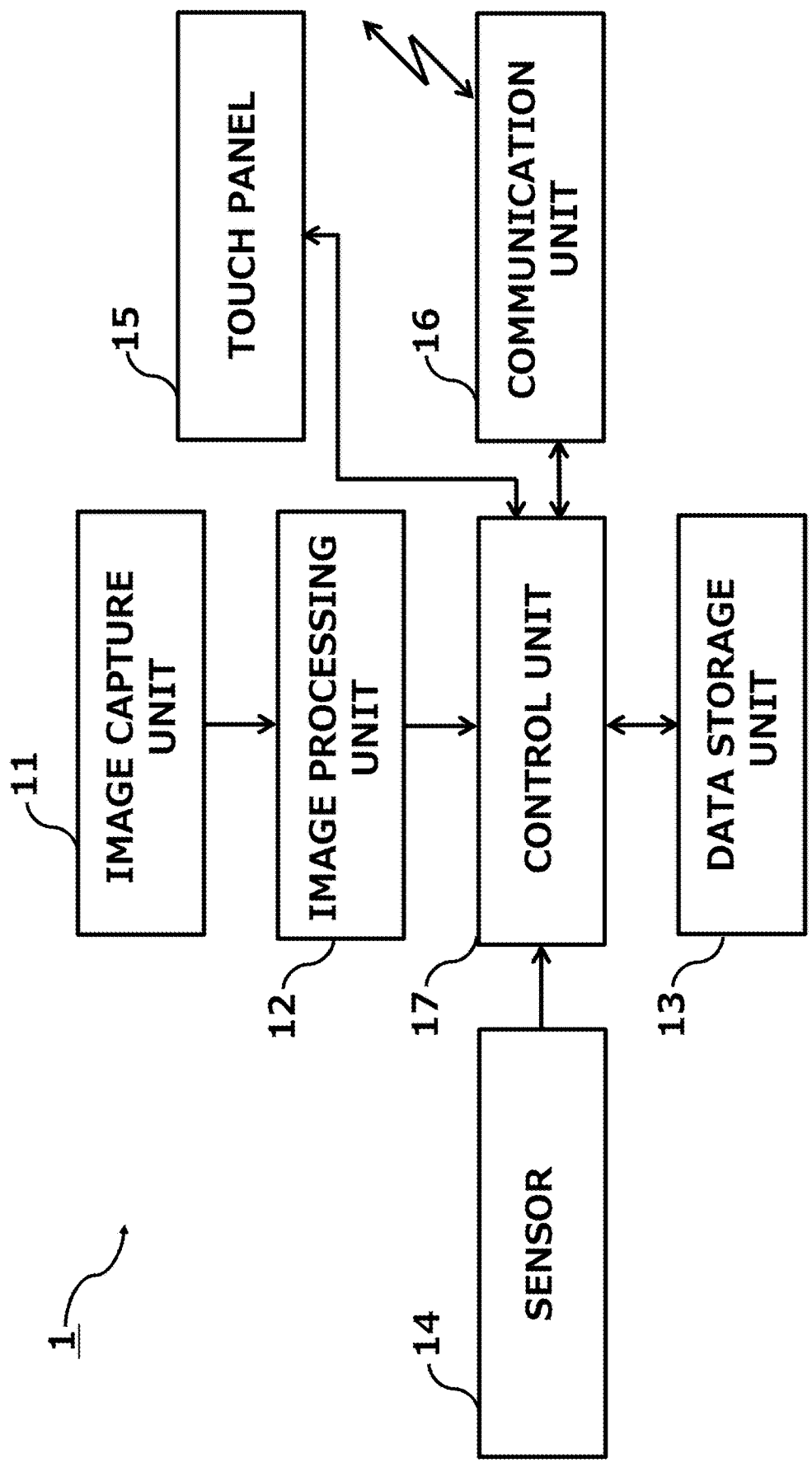
FIG. 1 is a diagram indicating a configuration of a smartphone according to an embodiment.

(Configuration of smartphone 1) FIG. 1 is a diagram indicating a configuration of a smartphone 1 according to the present embodiment.

The smartphone 1 includes an image capture unit 11 that captures images of a subject, an image processing unit 12 that performs predetermined image processing on the image generated by the image capture unit 11, and a data storage unit 13 that stores the images and other data.

The smartphone 1 further includes a sensor 14 for detecting a physical quantity relating to movement in the three axial directions, a touch panel 15 for displaying images, an operation screen, or the like, and a communication unit 16 for communicating data with an external device.

The smartphone 1 not only operates in response to an operation of the touch panel 15, but also operates in response to a gesture of a user, which will be described later, such as a flip operation or a tap operation. In the present embodiment, the smartphone 1 mainly operates in accordance with gestures or a still state of the user.

Figure 2:
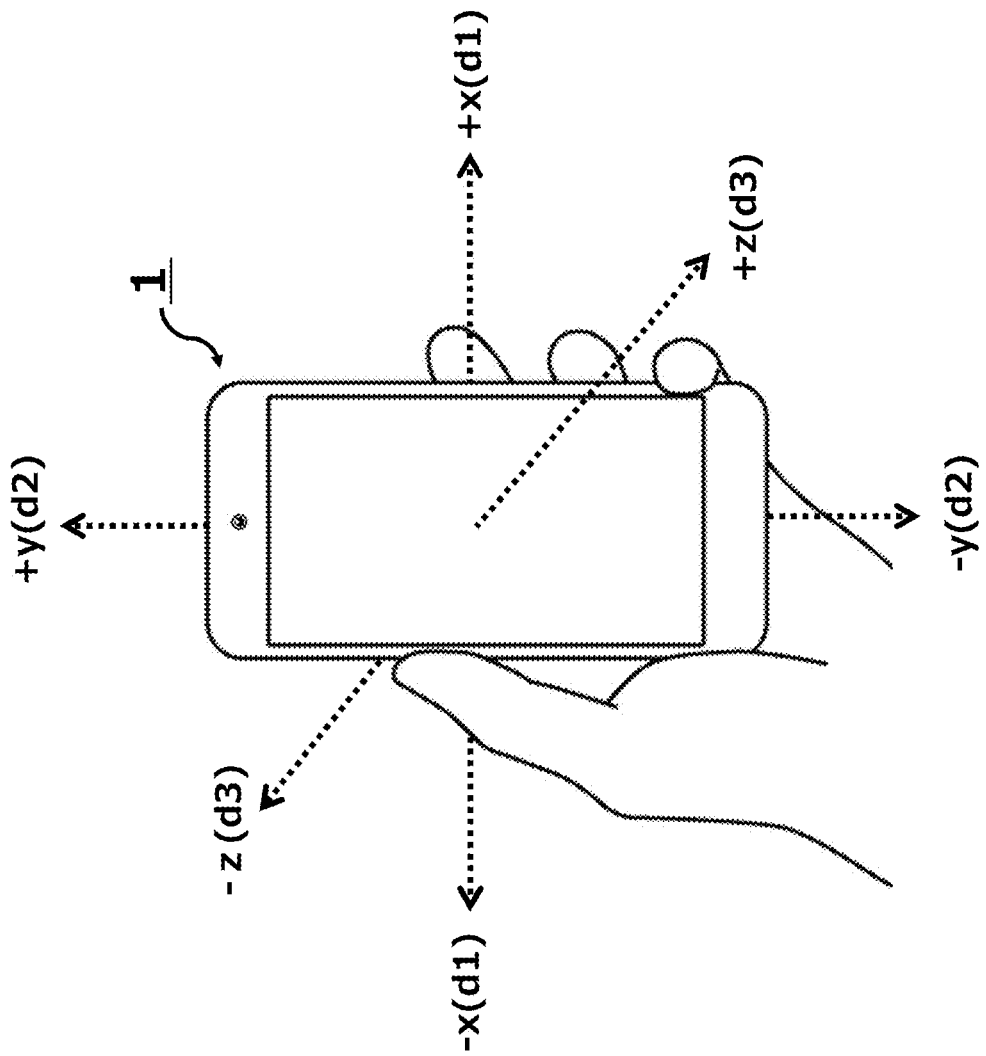
FIG. 2 is a diagram indicating a state in which a user holds a smartphone.

FIG. 2 is a diagram indicating a state in which the user holds the smartphone 1 in the xyz space of the right hand coordinate system. The origin of the xyz space is the center of the smartphone 1.

The smartphone 1 is covered with a housing having a rectangular surface elongated in the uniaxial direction (y-axis in FIG. 2). The touch panel 15 is provided on the xy plane, specifically, on the above-described rectangular surface. The z-axis is in a direction orthogonal to the touch panel 15. In the present embodiment, when shooting, the user holds the smartphone 1 in an xyz space as shown in FIG. 2. In the present embodiment, when the user holds the smartphone 1, the directions of the x-axis, the y-axis, and the z-axis are defined as follows.

The upper side of the longitudinal direction of the touch panel 15 becomes a positive y-axis direction, its lower side becomes a negative y-axis direction. The right side of the direction perpendicular to the longitudinal direction of the touch panel 15 becomes a positive x-axis direction, the left side becomes a negative x-axis direction. The front side of the touch panel 15 becomes the positive z-axis direction, the back side of the touch panel 15 becomes the negative z-axis direction.

As shown in FIG. 1, the image capture unit 11 is an image sensor that generates an image in response to light from the subject. Imaging unit 11, for example, CCD image sensor, CMOS image sensor corresponds. In the present embodiment, the smartphone 1 is provided with two imaging units 11. One of the two imaging units 11 is provided on the same rectangular surface as the touch panel 15, the other is provided on a rectangular surface of the back side of the touch panel 15.

The image capture unit 11 includes an electronic shutter function and generates a frame image for a still image or a moving image. The release operation of the still image shooting is performed by tapping the display button on the touch panel 15 or gestures to the smartphone 1 main body.

In the present embodiment, the release operation is performed by a gesture on the main body of the smartphone 1. The frame image generated by the image capture unit 11 is displayed on the touch panel 15 as a live moving image or is stored in the data storage unit 13.

The image processing unit 12 executes predetermined image processing such as white balance adjustment and gamma correction for the frame image generated by the image capture unit 11. The image subjected to the predetermined processing by the image processing unit 12 is stored in the data storage unit 13. In the case of the live moving image, the image is temporarily stored in the data storage unit 13, and thereafter is supplied to the touch panel 15 for display of the live moving image.

The data storage unit 13 corresponds to, for example, a DRAM, a flash memory, or the like, and temporarily or long-term stores data. Various application programs are stored in the data storage unit 13. The control unit 17 executes predetermined data processing in accordance with the application program described above.

The data storage unit 13 stores an image generated by the image capture unit 11, data received from an external network by the communication unit 16, and the like. Writing of data to the data storage unit 13 and reading of data from the data storage unit 13 are controlled by the control unit 17.

The sensor 14 is a motion sensor that detects information about the movement of the smartphone 1. In the present embodiment, the sensor 14 is an acceleration sensor that detects acceleration in each of the three axial directions of the smartphone 1. The sensor 14 detects accelerations in the three axial directions of the smartphone 1, and supplies the detected values to the control unit 17.

The sensor 14 is an acceleration sensor in the present embodiment, but if it is possible to detect information about the movement of the smartphone 1, it is not limited to the acceleration sensor. For example, the sensor 14 may be a speed sensor, an angular velocity sensor (gyro sensor), a geomagnetic sensor.

The touch panel 15 is provided on the front surface of the smartphone 1. The frame image generated by the image capture unit 11 or read from the data storage unit 13 is displayed on the touch panel 15. Various operation buttons for operating the smartphone 1 are displayed on the touch panel 15.

(Operation mode) The smartphone 1 has a photographing mode, a moving image photographing mode, and a live moving image (preview moving image) mode.

In the photographing mode, the user determines the photographing position of the smartphone 1 while confirming the subject displayed on the touch panel 15. When a release operation for a still image is performed, a single frame image (photographic image) or a plurality of frame images (continuous shooting images) specified by the release operation are stored in the data storage unit 13 and displayed on the touch panel 15.

In the movie shooting mode, the user determines the shooting position of the smartphone 1 while checking the subject displayed on the touch panel 15. When a release operation for a moving image is performed, a plurality of frame images (moving images) after the release operation are stored in the data storage unit 13 and displayed on the touch panel 15.

In the live video mode, the user confirms the subject to be displayed on the touch panel 15. At this time, a plurality of frame images generated by the image capture unit 11 are stored in the data storage unit 13 and displayed on the touch panel 15. That is, even in the live moving image mode, the frame image is stored in the data storage unit 13.

In any of the three modes described above, the frame image stored in the data storage unit 13 is displayed on the touch panel 15 when the reproduction operation is performed. In addition, the control unit 17 can download a still image or a moving frame image from an external server and store the downloaded still image or moving frame image in the data storage unit 13. Thereafter, the control unit 17 can also read the downloaded frame image from the data storage unit 13 and display it on the touch panel 15.

The communication unit 16, via the communication network, between the external device such as an external server, can transmit and receive frame images and other data. The control unit 17 includes, for example, a central processing unit (CPU), and controls the entire smartphone 1 by executing various applications such as a photographing application stored in the data storage unit 13.

The control unit 17 periodically receives the respective detected values in the three axial directions from the sensor 14, based on the time change pattern of their detected values, and controls the smartphone 1. Specifically, the control unit 17 determines whether the smartphone 1 is in a still state or a gesture is performed to the smartphone 1 and determines the release timing of still image shooting based on the determination result to obtain the frame image of the still image.

(Contents of gestures) The user can perform a release operation of still image shooting by performing gestures to the smartphone 1. In the present embodiment, a tap operation and a flip operation are used as gestures for instructing a release operation of still image shooting.

Figure 3A:
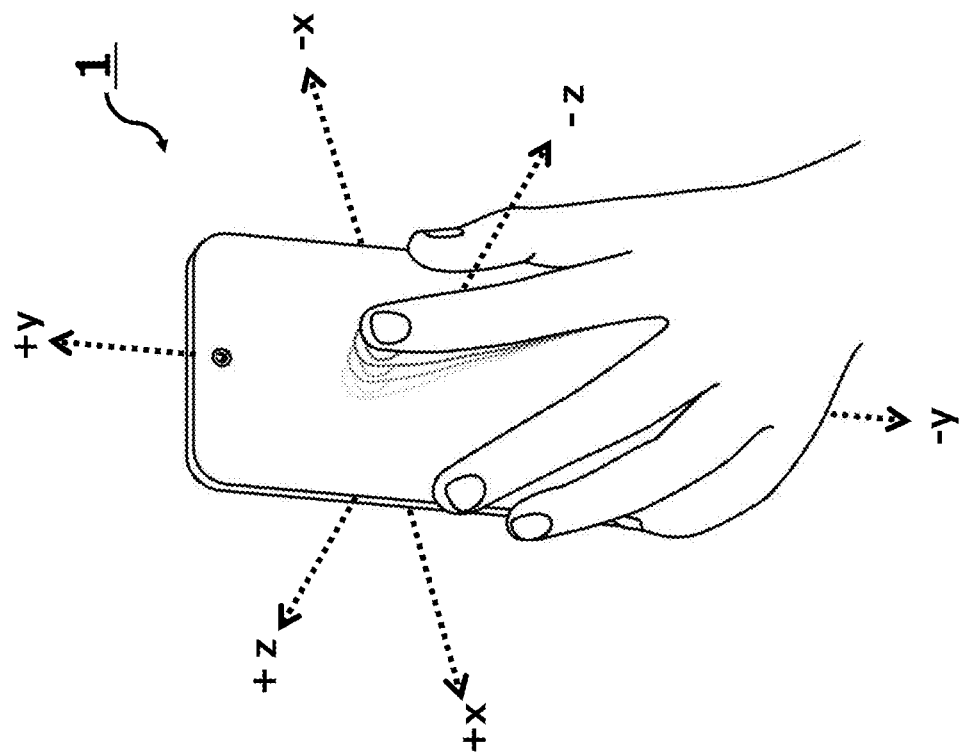
FIG. 3A is a diagram for explaining tapping operations by the user.
Figure 3B:
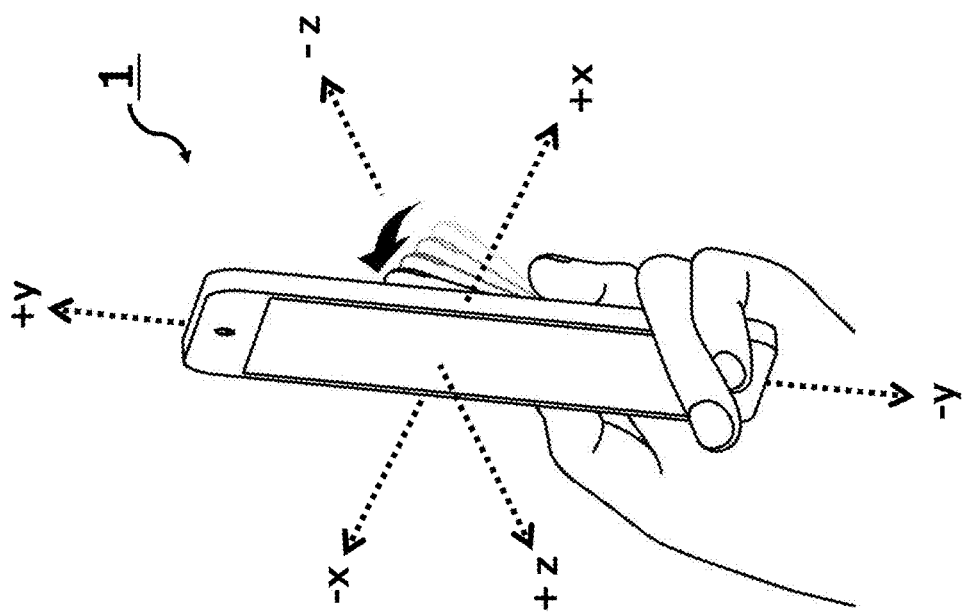
FIG. 3B is a diagram for explaining tapping operations by the user.

FIG. 3A and FIG. 3B are diagrams for explaining tapping operations of the user to the smartphone 1. As shown in FIG. 3, the user holds the lower part of the smartphone 1 with his/her right hand and determines the position and the shooting direction of the smartphone 1 so that the subject (e.g., the user himself/herself when shooting himself/herself) is appropriately displayed on the touch panel 15.

Next, the user securely stops the smartphone 1. Then, in a state where the smartphone 1 is still, the user hits the back surface of the smartphone 1, i.e., the side opposite to the touch panel 15, with the index finger, and applies vibration to the smartphone 1. As described above, the tap operation means that the back surface of the smartphone 1 is hit with a finger.

In the xyz space shown in FIG. 2, the user taps the smartphone 1 in the z-axis direction. The x-coordinate and the y-coordinate of the tapped location may be arbitrary. At this time, the smartphone 1, vibration is generated not only in the z-axis direction, but also in the x-axis direction and the y-axis direction. Vibration in each axial direction is detected by the sensor 14 in FIG. 1.

The hand holding the smartphone 1 may be a right hand or a left hand. The user may hold the smartphone 1 vertically or horizontally. In the present embodiment, the user hits the back surface of the smartphone 1, but may hit the front surface or the side surface of the smartphone 1. The user may also hit the upper or lower side of the body of the smartphone 1.

Figure 4:
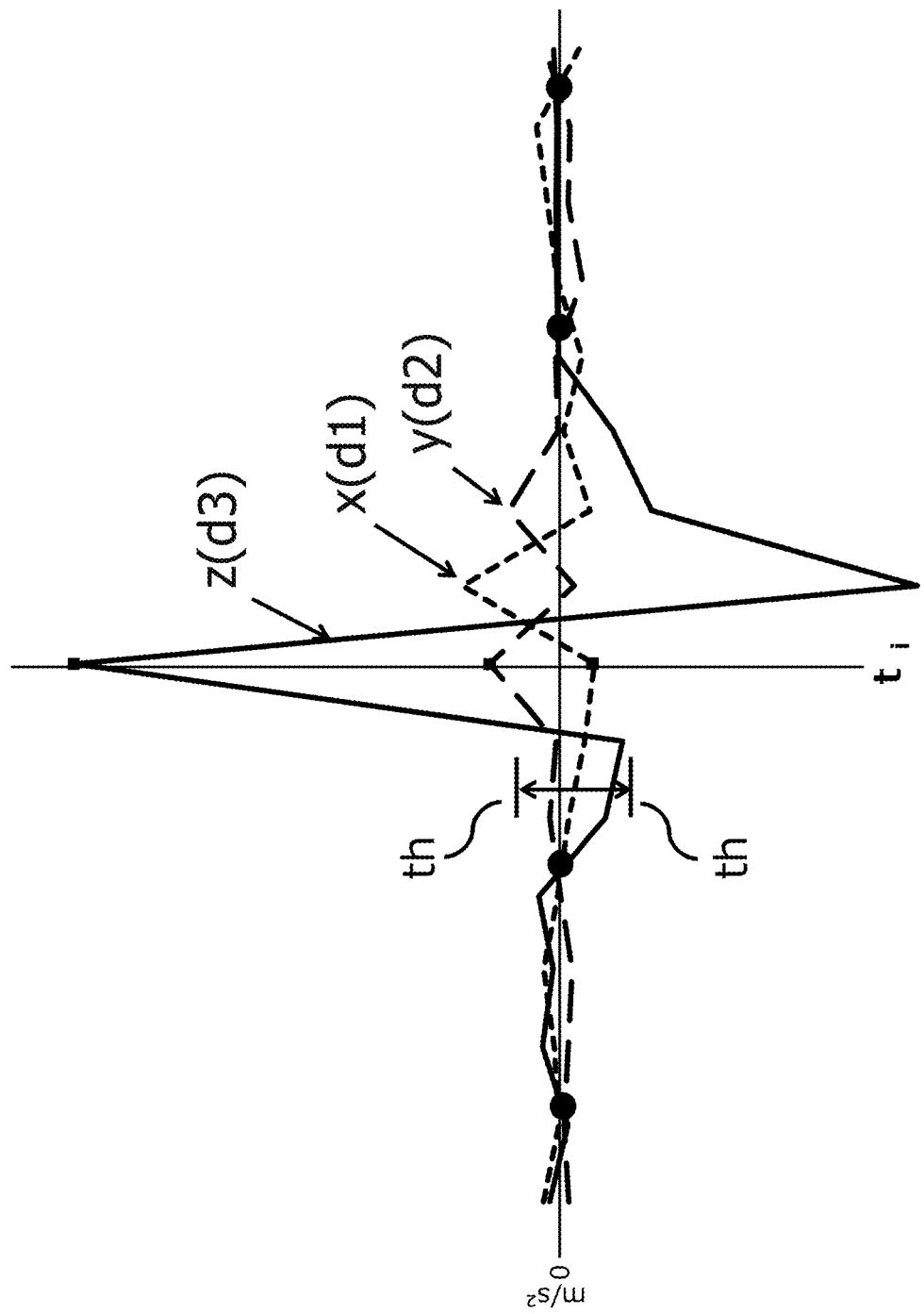
FIG. 4 is a diagram indicating a change in the respective acceleration in the three axial directions when the tapping operation is performed.

FIG. 4 is a diagram indicating changes in acceleration in each of the three axial directions when a tap operation is performed to the smartphone 1. When the flip operation is performed when the smartphone 1 is in a still state, each acceleration in the three axial directions becomes a characteristic waveform.

Specifically, when the flip operation is performed, the acceleration d3 in the z-axis direction reaches a peak beyond the threshold th. In synchronization with the timing at which d3 reaches the peak (time $t_i$), the acceleration d1 in the x-axis direction and the acceleration d2 in the y-axis direction also reach the peak. Thus, at the timing at which the peak values are synchronized for the first time, d1 is a negative value, but d2 and d3 are positive values.

Figure 5:
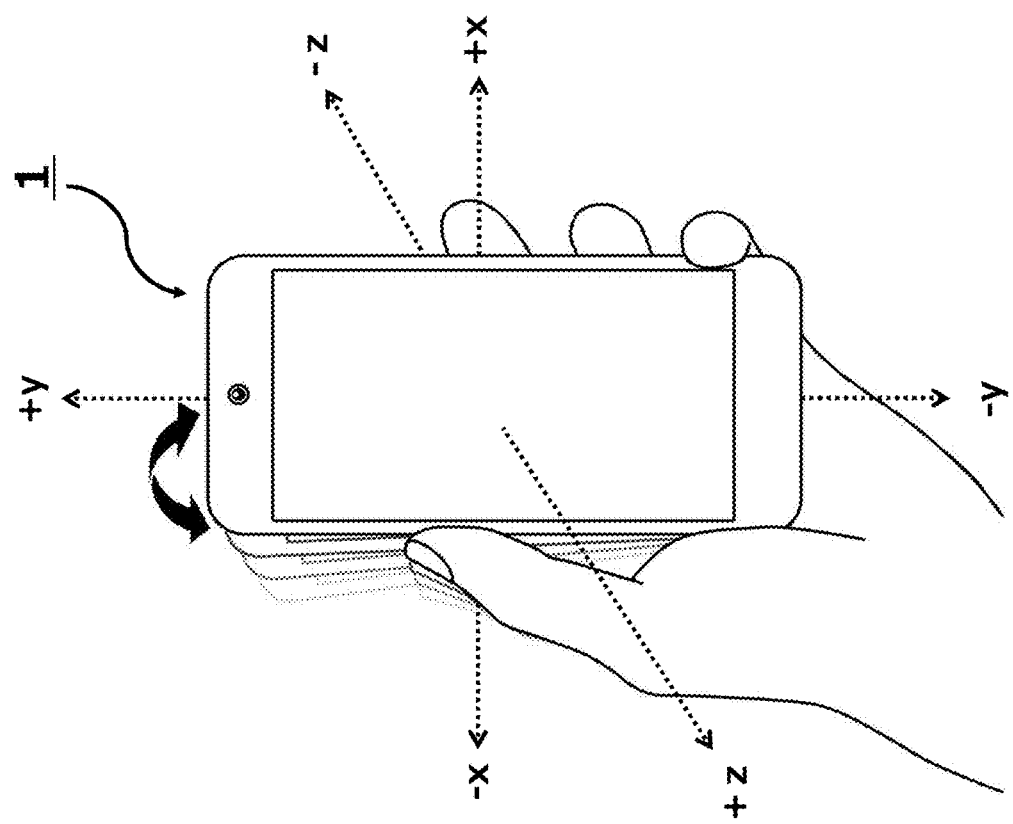
FIG. 5 is a diagram for explaining a flip operation by the user.

FIG. 5 is a diagram for explaining a user's flip operation to the smartphone 1. As shown in FIG. 5, the user holds the lower part of the smartphone with his/her right hand, and determines the position and the shooting direction of the smartphone 1 so that the subject (e.g., the user himself/herself when shooting himself/herself) is appropriately displayed on the touch panel 15.

Next, the user securely stops the smartphone 1. Then, the user tilts the smartphone 1 to the back side, then quickly returns to the original rest position, and applies vibration to the smartphone 1. As described above, the flip operation means that the smartphone 1 is tilted in a predetermined direction from a still state and then quickly returned to the original still position.

In the xyz space shown in FIG. 2, the user tilts the smartphone 1 about the z-axis. Note that the direction in which the smartphone 1 is inclined is not limited to around the z-axis, and may be around the x-axis or around the y-axis. The hand holding the smartphone 1 may be a right hand or a left hand.

Figure 6:
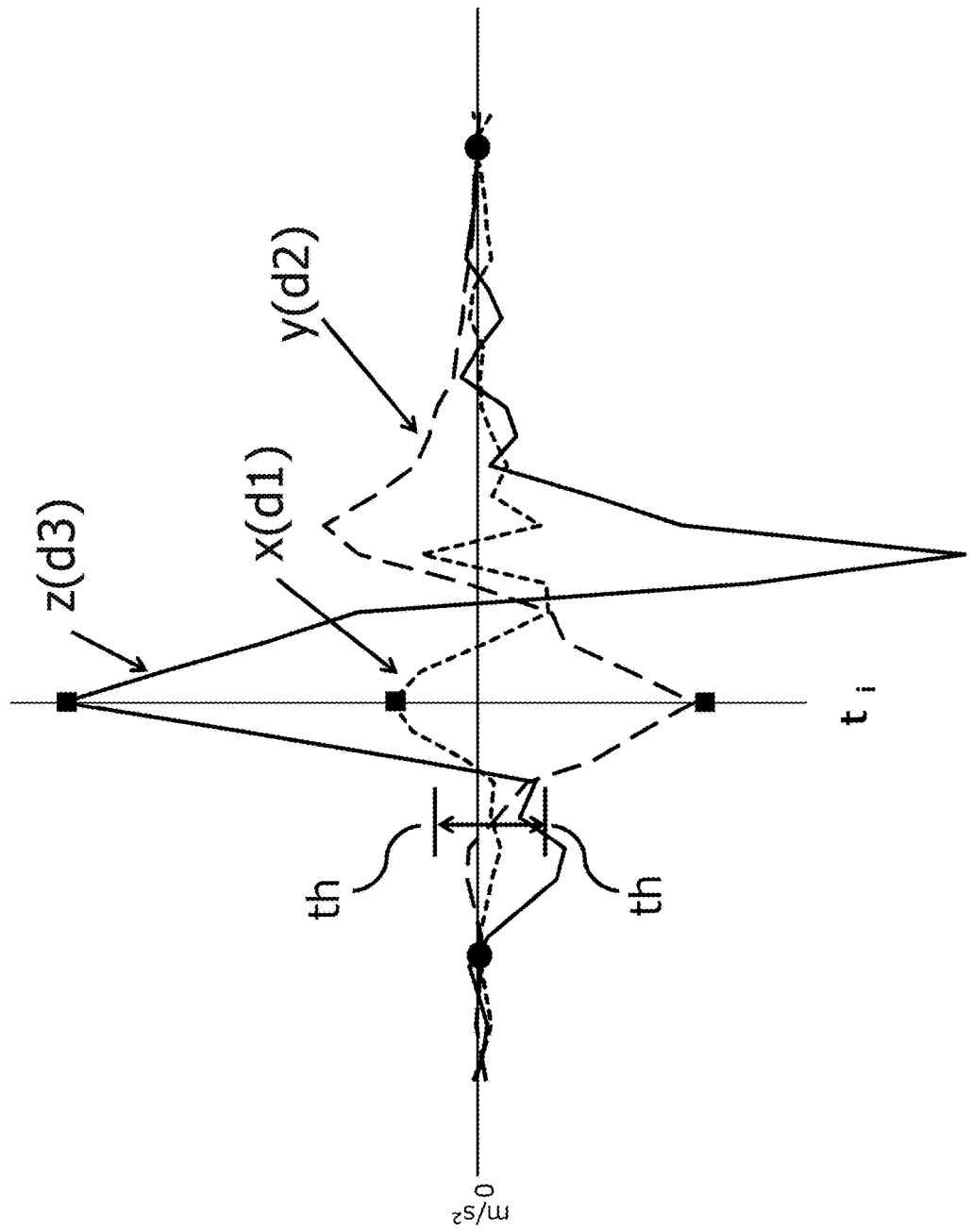
FIG. 6 is a diagram indicating a change in the respective acceleration in the three axial directions when the flip operation is performed.

FIG. 6 is a diagram indicating changes in acceleration in each of the three axial directions when a flip operation is performed to the smartphone 1. When the flip operation is performed when the smartphone 1 is in a still state, each acceleration in the three axial directions becomes a characteristic waveform.

Specifically, when the flip operation is performed, the acceleration d3 in the z-axis direction reaches a peak beyond the threshold th. In synchronization with the timing at which d3 reaches the peak (time $t_j$), the acceleration d1 in the x-axis direction and the acceleration d2 in the y-axis direction also reach the peak. Thus, at the timing at which the peak values are synchronized for the first time, d1 is a negative value, but d2 and d3 are positive values. In other words, each acceleration in the three axial directions when the flip operation is performed becomes a characteristic waveform similar to when the tap operation is performed.

(Determination of the Still State) In the case of the photographing mode, the control unit 17 of the smartphone 1 determines the still state as follows.

In the case of the photographing mode, the control unit 17 constantly monitors the respective detected values in the three axial directions supplied from the sensor 14. When the state in which the absolute values of all the detection values of the sensor 14 become equal to or less than the predetermined value continues for a predetermined time or longer, the control unit 17 determines that the continuous period is the still state of the smartphone 1.

Here, the detected values (acceleration) of the sensor 14 in the x-, y-, and z-axis directions are x, y, and z, respectively. The micro time is $\Delta t$. The sensor output threshold value for determining the still state is defined as $\alpha$. Note that $\alpha$ is a value in the vicinity of zero. At this time, the control unit 17 determines whether or not expression (1) is satisfied.

$$(|d1| + |d2| + |d3|)/3 < \alpha \tag{1}$$

Figure 7:
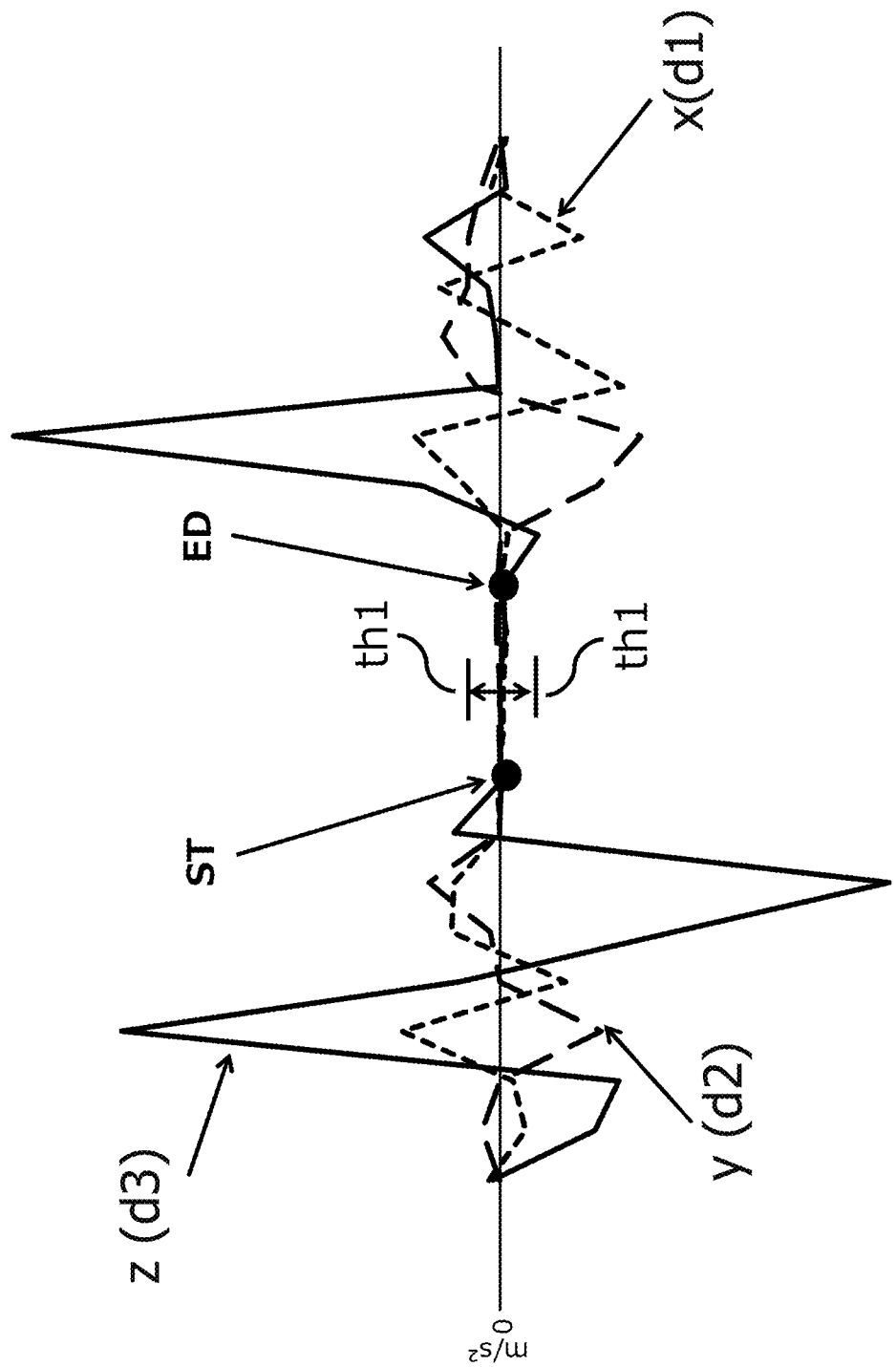
FIG. 7 is a diagram indicating a still start point and a still end point to be set in the determination of the still state.

FIG. 7 is a diagram indicating a still start point ST and a still end point ED to be set in the determination of the still state. When the state satisfying the expression (1) exceeds a predetermined time, the control unit 17 determines that the period is a still state of the smartphone 1. Then, the control unit 17 sets the time point at which the equation (1) is satisfied for the first time as the still start point ST and stores the information of the still start point ST (still start point information) in the data storage unit 13. The still start point information is the time of the still start point ST and the accelerations d1, d2, and d3 of the still start point ST in the respective axial directions xyz.

When the equation (1) is not satisfied after the predetermined time has elapsed, the control unit 17 sets the point of time when the equation (1) is not satisfied as the still end point ED and stores the information of the still end point ED (still end point information) in the data storage unit 13. Still end point information is the time of the still start point ST (time) and the acceleration in each axial direction of xyz.

The determination method of the still state by the control unit 17 is not limited to the method described above, if it is possible to determine the start point information of the still state based on the detected value of the sensor 14, it is also applicable to other methods.

For example, the determination condition as to whether or not the state is a still state is not limited to the equation (1) and may be the following examples. For example, the control unit 17 may determine whether or not at least one of the detected values in each of the three axial directions outputted from the sensor 14 is less than the threshold th1, as shown in FIG. 7. That is, the control unit 17 may determine whether or not at least one of the accelerations d1, d2, and d3 is less than the threshold th1. Alternatively, the control unit 17 may determine, using three accelerations d1, d2 and d3 supplied from the sensor 14 for each micro time $\Delta t$, whether or not at least one of the absolute values of the respective changes per unit time $\Delta d1$, $\Delta d2$, and $\Delta d3$ is less than a predetermined threshold.

As a result of the above-described still determination processing, the control unit 17 determines that the state becomes a still state when the state becomes an affirmative determination exceeds a predetermined period of time, for example, 0.3 seconds. Note that the time is not limited to 0.3 seconds and may be any time from 0.1 to 1.0 seconds. In this case, the control unit 17 sets the time point at which the above-mentioned condition is satisfied for the first time as the still start point ST, and sets the time point at which the above-mentioned condition is not satisfied as the still end point ED. The determination of the still state is performed before or after the gesture detection, which will be described later.

(Gesture detection) As described in FIGS. 4 and 6, when the user performs a gesture (tap operation or flip operation) to the smartphone 1, the time change pattern of the three detected values (acceleration) of the sensor 14 has the following two features.

The first feature is that if one detected value exceeds a threshold value and reaches the first peak, the other two detected values also become the first peak substantially synchronously. That is, the first peaks of the three detected values occur substantially synchronously. The second feature is that when one detection value exceeds the threshold value and reaches the first peak, the sign of one of the three detection values is different from the sign of the other two detection values.

In consideration of the above-described two features, the control unit 17 detects whether or not there is a gesture (a tap operation or a flip operation) using the respective three detected values in the three axial directions of the sensor 14 at every predetermined period according to the following procedure and generates a trigger signal at the timing when gesture is performed.

(Procedure 1) The control unit 17 determines whether or not the amount of change per predetermined time exceeds a predetermined threshold value for at least one of the three detection values in each of the three axial directions of the sensor 14 every predetermined period of time. When the amount of change of at least one of the three detection values exceeds the threshold value in a certain predetermined period, the control unit 17 proceeds to the next process.

(Procedure 2) In the above predetermined period, the control unit 17 determines whether one of the three detected values has a positive/negative sign (for example, a positive sign) and the other two of the three detected values have the other positive/negative sign (for example, a negative sign).

In the case of an affirmative determination result, the control unit 17 determines that the user is performing the gesture operation, and sets the time point at which the determination result is obtained as the gesture start time point. Thus, at the beginning of the gesture, there is a property that the three detected values of the sensor 14 change instantaneously (substantially synchronously) and the positive/negative sign of one of the three detected values is different from the remaining two positive/negative signs.

(Procedure 3) If there is the still state after the gesture is detected, the control unit 17 sets the point one frame before the start point of the still state as the gesture end point.

(Gesture Detection Method 1) The control unit 17 detects the gesture as follows. Control unit 17 receives three detected values d1, d2, and d3 periodically every micro time $\Delta t$ from the sensor 14.

The control unit 17 determines whether or not at least one of the three detection values d1, d2, and d3 exceeds a threshold value every micro time $\Delta t$. In the case of an affirmative determination, the control unit 17 sets the time ti as the starting point of the time variation pattern when at least one of the three detected values d1, d2, d3 exceeds the threshold value.

Next, the control unit 17 determines the signs of the three detection values d1, d2, and d3 at the start point of the time change pattern. Specifically, the control unit 17 determines whether or not one sign of the three detected values is different from the other two signs. In the case of an affirmative determination, the control unit 17 sets a time point at which an affirmative determination is obtained as a gesture start time point and generates a trigger signal indicating gesture detection. Thereafter, when there is a period of the still state after the gesture detection, the control unit 17 sets the point of time one frame before the still start point to the gesture end point.

(Gesture Detection Method 2) In addition to the gesture detection method 1 described above, the control unit 17 may detect a gesture as followings.

Figure 8:
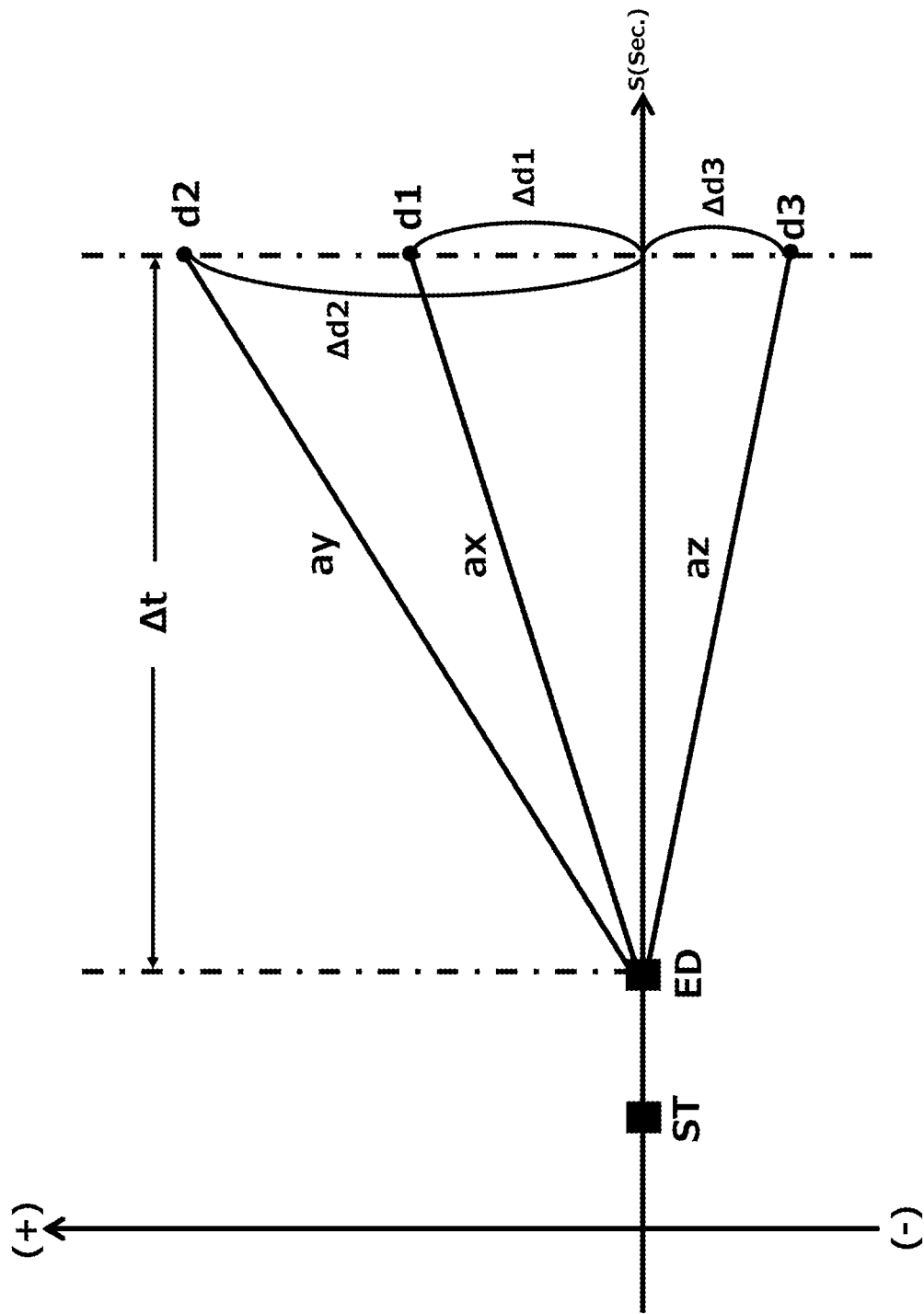
FIG. 8 is a diagram for explaining the parameters of the expression for the gesture detection.

FIG. 8 is a diagram for explaining the parameters of the expression for the gesture detection. The control unit 17 calculates the following equations (2) to (4) for each micro time Δt. Note that Δd1, Δd2, and Δd3 are amounts of change of d1, d2, and d3 in the micro time Δt.

$$Ax = \Delta d1 / \Delta t \qquad (2)$$

$$Ay = \Delta d2 / \Delta t \qquad (3)$$

$$Az = \Delta d3 / \Delta t \qquad (4)$$

Ax, ay, and az indicate the slope per minute Δt (sampling period) of the detected values in the x-, y-, and z-axis directions of the sensor 14, respectively. Next, the control unit 17 determines whether or not at least one of the following equations (5) to (7) is satisfied.

$$|ax| \geq 2 \qquad (5)$$

$$|ay| \geq 2 \qquad (6)$$

$$|az| \geq 2 \qquad (7)$$

When at least one of the equations (5) to (7) is satisfied and two values of ax, ay, and az have the same sign and the other one value has a different sign, the control unit 17 sets a time point when these conditions are satisfied as a gesture start time point, and generates a trigger signal indicating gesture detection.

The control unit 17, together with the frame images, may store the change amount of each of the three detected values of the sensor 14 in the data storage unit 13. Further, the control unit 17 may perform calculation and determination for gesture detection in real time during photographing of the subject or may perform calculation and determination independently after photographing the subject. "2" in the equations (5) to (7) are a threshold value for detecting a gesture. The threshold value is not limited to "2", and may be another value.

In the present embodiment, the control unit 17 uses the equations (2) to (7) to detect the gesture of the user, but is not limited to the equations (2) to (7). That is, the determination expression is not particularly limited as long as the control unit 17 can execute the above-described procedures 1 to 3.

(Still image shooting in Photo shooting mode) In the photographing mode, the frame images generated by the image capture unit 11 are sequentially stored in the data storage unit 13. The user performs a shutter operation (gesture) while keeping the smartphone 1 still while checking the subject displayed on the smartphone 15. At this time, the control unit 17 executes the above-described still state determination processing and gesture detection processing independently of each other to acquire a still image.

More specifically, when the gesture is detected, the control unit 17 selects an optimal frame image as a still image from a plurality of frame images stored in the data storage unit 13 by using the determination result of the still state.

Figure 9:
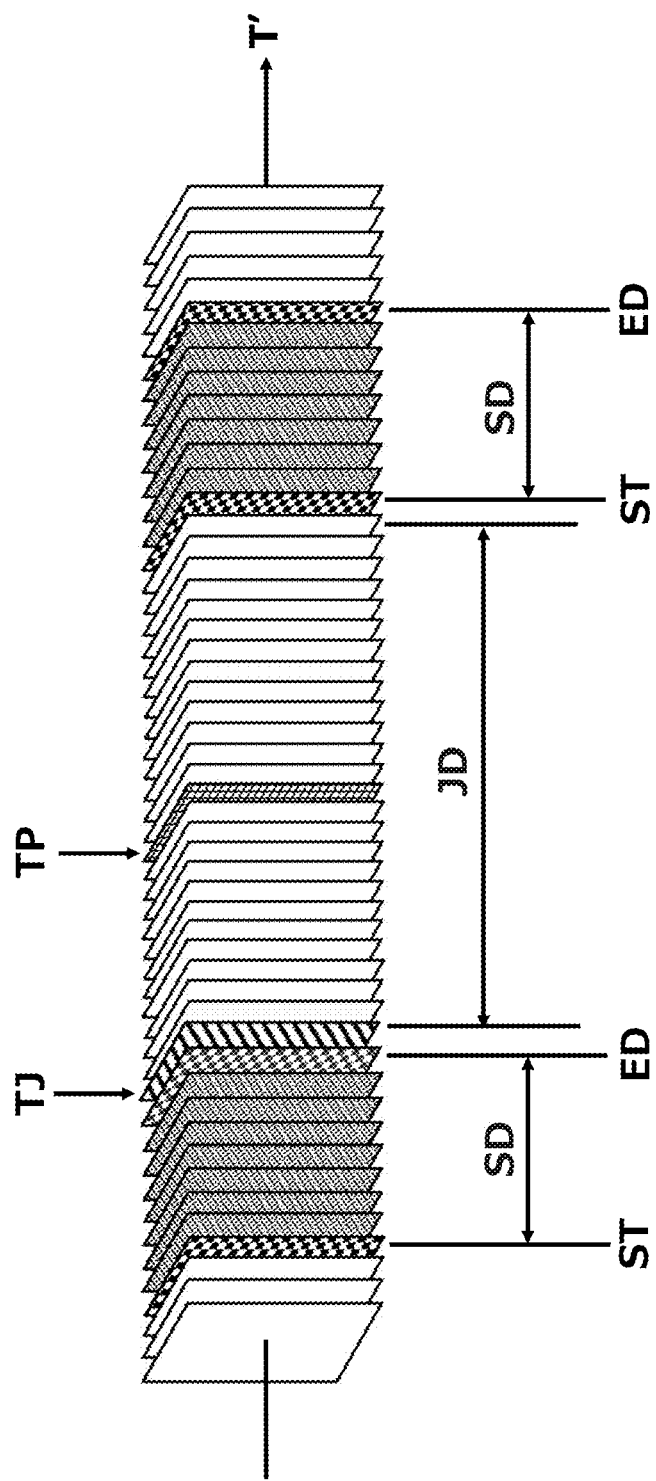
FIG. 9 is a diagram illustrating a still image selected from a plurality of frame images.

FIG. 9 is a diagram illustrating a still image selected from a plurality of frame images. When a gesture is detected, there normally exists a period in which the gesture is in a still state before or after the gesture detection time TJ, i.e., a still period SD from the still start point ST to the still end point ED. The peak time TP of the detected value is after the gesture detection time TJ. Therefore, the control unit 17 selects a frame image optimal for the still image from the plurality of frame images of the still period SD before or after the gesture detection JD. The frame image is selected by the following method.

(Selection Method of Frame Image) For example, when there are still periods before and after the gesture detection time as a reference, the control unit 17 may select a frame image that is closest in time to the gesture detection time as a still image from all the frame images within the still period.

When the time from the still end point to the next gesture detection time exceeds a predetermined time (for example, an arbitrary time from 0 to 5 seconds), the control unit 17 can exclude the frame images of the still period including the still end point from the subject of the still image. When the time from the gesture detection to the next still start point exceeds the predetermined time, the control unit 17 can exclude the frame images of the still period including the still start point from the still image.

When the time between the gesture and the still period exceeds the predetermined time, the frame image of the still period is often different from the still image desired by the user. Therefore, when the above-described condition is satisfied, the control unit 17 can prevent the malfunction of the photographing operation by excluding the frame images of the still image period from the object of the still image. In addition, a proximity sensor mounted on the smartphone 1 may be used to prevent malfunction.

That is, the control unit 17 may determine whether or not the time between the gesture and the still period exceeds the predetermined time, select a still period in which the time between the gesture and the still period does not exceed the predetermined time, and select a frame image from the selected still periods.

When selecting a still image from among the frame images of the still period, the control unit 17 may select, for example, a frame image of the still start point. The control unit 17 may select a frame image after a predetermined time from the still start point or may select a frame image after a predetermined number of frames from the still start point.

The control unit 17 can also select an optimal still image from the frame images of the still period in accordance with the movement of the smartphone 1. Specifically, the control unit 17 detects the magnitude, the inclination direction, and the initial speed of the vibration of the smartphone 1 based on the three detected values from the sensor 14. Then, using the detection result, the control unit 17 may determine whether the frame image before or after the number of frames is optimal as the still image from the time of gesture detection and select the optimum frame image.

Further, when the continuous shooting function is set, the control unit 17 may select predetermined numbers of frame images from a plurality of frame images in the still period or may select all the frame images in the still period.

(Still image shooting using still judgment only) The control unit 17 can also select a still image by performing only the still determination without detecting gestures. Specifically, the control unit 17 sets the still start point ST by performing the still determination process described above. Next, the control unit 17 determines whether or not a predetermined time has elapsed within the still period with reference to the still start point ST. Control unit 17 generates a trigger signal when a predetermined time has elapsed with reference to the still start point ST.

Then, the control unit 17 selects a frame image at the time when the trigger signal is generated from a plurality of frame images stored in the data storage unit 13 as a still image. As a result, the user can shoot a still image by simply making the smartphone 1 still.

(Method of selecting a frame image using a histogram) The control unit 17 can select the most suitable frame image for the still image using the histogram. Specifically, the control unit 17 calculates the RGB color histogram of the frame image at the time of gesture detection and the RGB color histogram of the frame image within the still period, respectively, and obtains the difference between the RGB color histograms of the frame images.

The control unit 17 selects the above-mentioned frame image within the still period as a still image when the difference in the RGB color histogram of each frame image is less than the threshold value, and makes the above-mentioned frame image within the still image outside the scope of the still image when the difference in the RGB color histogram of each frame image is more than the threshold value.

Normally, the user determines the position (shooting position and shooting direction) of the shooting frame before the gesture operation. When the difference between the RGB color histograms described above is equal to or larger than the threshold value, the frame image at the time of gesture detection and the frame image within the still period are largely different from each other, and there is a possibility that positional deviation of the captured frame occurs. Therefore, by performing the above-described processing, positional deviation of the photographing frame can be avoided.

The user may set a time change pattern, a threshold value, and a determination/detection method suitable for the user in advance. As a result, the control unit 17 can use the optimal time change pattern, threshold value, and determination/detection method for each user.

Figure 10:
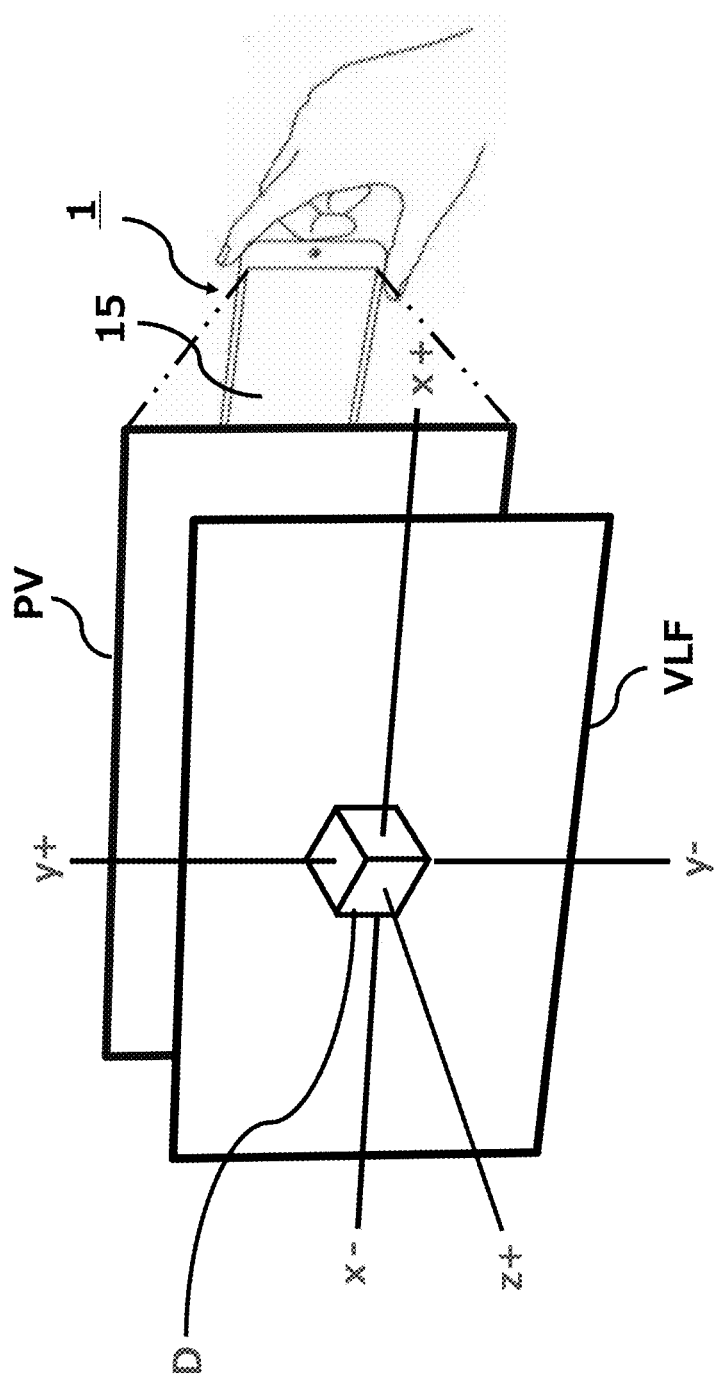
FIG. 10 is a diagram indicating a display object displayed on the touch panel for assisting the operation timing.

(Assistance of Operation Timing by Visualization of Detected Values) FIG. 10 is a diagram indicating a display object D displayed on the touch panel 15 for assisting the operation timing. The control unit 17 may use a transparent virtual layer file VLF overlaid on the preview image PV of the touch panel 15 to visualize each detected value in the three axial directions of the sensor 14 to assist the user's operation timing.

Specifically, the control unit 17 calculates the detected value of the sensor 14 in real time. Then, the control unit 17 reads out a three-dimensional display object D described in the virtual layer file VLF (e.g., a horizontal standard, three axes of the xyz space, etc.) and displays it on the touch panel 15. Then, the control unit 17 converts the detected values in the three axial directions of the sensor 14 into three-dimensional coordinates, and dynamically moves the display object D of the three-dimensional shape. As a result, it is possible to display the display object D obtained by visualizing the state of the detected value of the sensor 14 on the touch panel 15.

As a result, the still state of the smartphone 1 and the movement of the gesture are visualized on the touch panel 15, and the gesture operation to the smartphone 1 can be assisted. The display object D and other information described in the virtual layer file VLF can be set for each user. The display object D may be a three-dimensional logo, a mark, or the like.

(Related information of frame image) In the data storage unit 13, not only the frame image but also related information of the frame image is stored by the control unit 17. As the related information, for example, each of the detected values in the three axial directions detected by the sensor 14 at the time of generation of the corresponding frame image, the time change amount of each detected value corresponds.

The other related information corresponds to, for example, a frame number indicating the number of frames from the time of occurrence of vibration or inclination of the smartphone 1 (gesture detection) of the corresponding frame image, a frame number indicating the number of frames from the time of detection of the still state, an angle, an inclination direction, and the like. Each frame number described above is automatically assigned in synchronization with T'. Further, when each frame number described above is specified, the frame image corresponding to each frame number specified is read.

The frame image and related information may be transmitted to the external server by the communication unit 16 and stored in the external server. The frame image and related information stored in the data storage unit 13 or the external server are read out as appropriate when the still image or moving image is played back.

For example, at the time of selecting a still image, the control unit 17 detects a still period in which all of the detection values in the three-axis directions or the time change amount of the detection values is within a predetermined threshold range, and the state (still state) continues for a predetermined time or longer. Next, in the still period, the control unit 17 selects the frame image in the state closest to the complete still as the still image.

The frame image in the state closest to the perfect still corresponds to, for example, the sum of the absolute values of all the detection values in the three axial directions or the frame image when the sum of the absolute values of the time change amounts of the respective detection values becomes the smallest value. Then, the control unit 17 reads the still image from the data storage unit 13 or the external server and displays the read still image on the touch panel 15.

The control unit 17 can also perform the following processing at the time of selecting a still image. For example, the control unit 17 may specify a still reference frame number or a gesture reference frame number and read out a frame image corresponding to the specified number from the data storage unit 13 or an external server. In addition, the control unit 17 may specify a feature amount such as an angle or an inclination, and read out a frame image corresponding to the specified feature amount from the data storage unit 13 or an external server.

Figure 11:
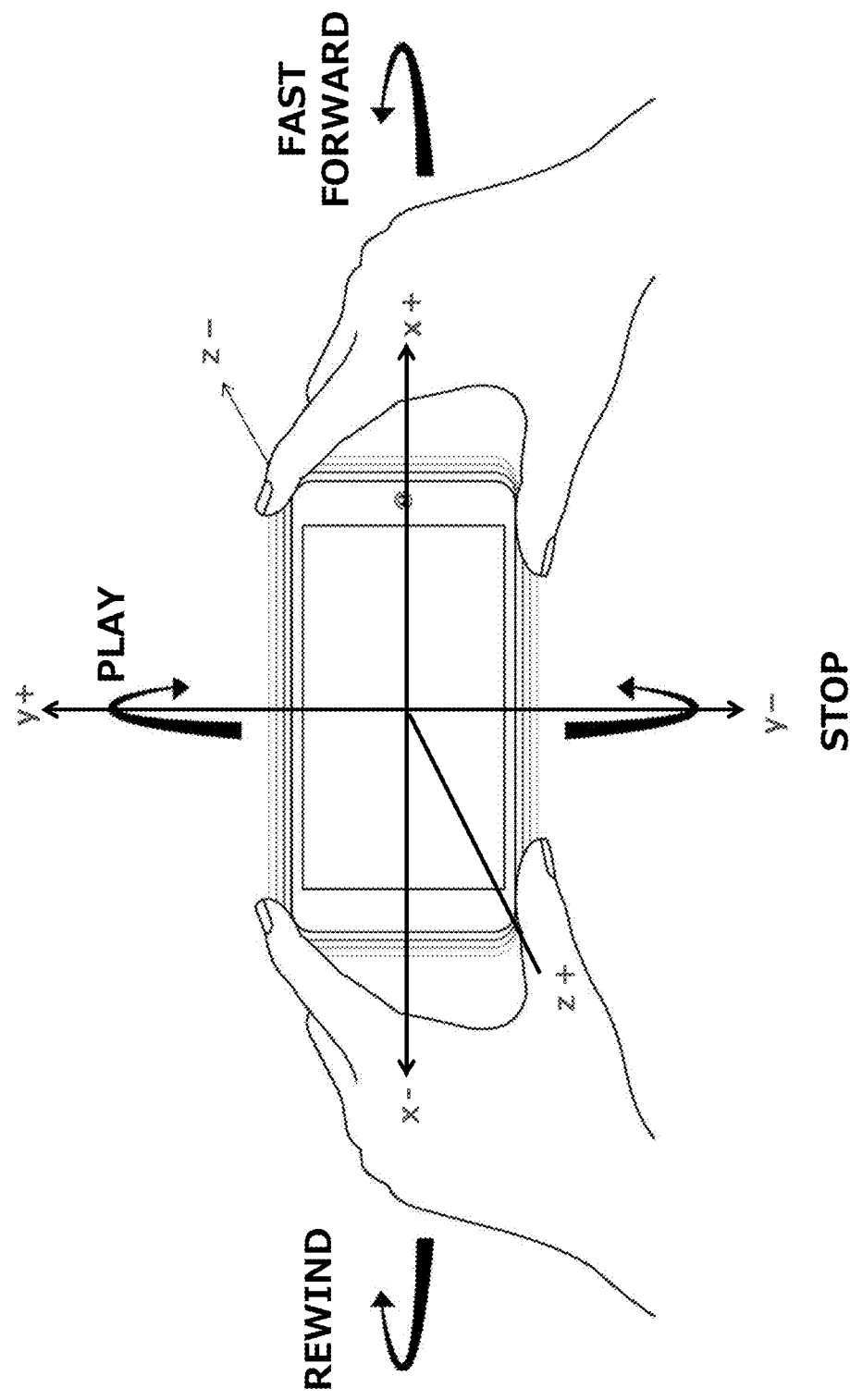
FIG. 11 is a diagram indicating moving image playback by a gesture operation.

(Play Function) FIG. 11 is a diagram indicating moving image play back by a gesture operation. The user can view moving images, scroll information displayed on the touch panel 15, and the like by performing a gesture operation (flip operation) of tilting the smartphone 1 in a predetermined direction.

When the gesture is detected by the gesture detection process described above, the control unit 17 determines the gesture contents (in which direction the smartphone 1 tilts) using the detected values in the three axial directions of the sensor 14 at the time of gesture detection. A table indicating the correspondence relationship between the gesture content and the reproduction function is stored in advance in the data storage unit 13.

The contents of the table are as follows. Among the four sides forming the outer edge of the smartphone 1, the upper side is the short side in the positive direction of the x-axis with respect to the smartphone 1. Furthermore, let the short side in the negative direction of the x-axis be the lower side, the side in the positive direction of the y-axis be the left side, and the side in the negative direction of the y-axis be the right side.

Gesture: Tilt the right edge once in the negative direction of the z-axis→Play

Gesture: Tilt the left edge once in the negative direction of the z-axis→Stop

Figure 12:
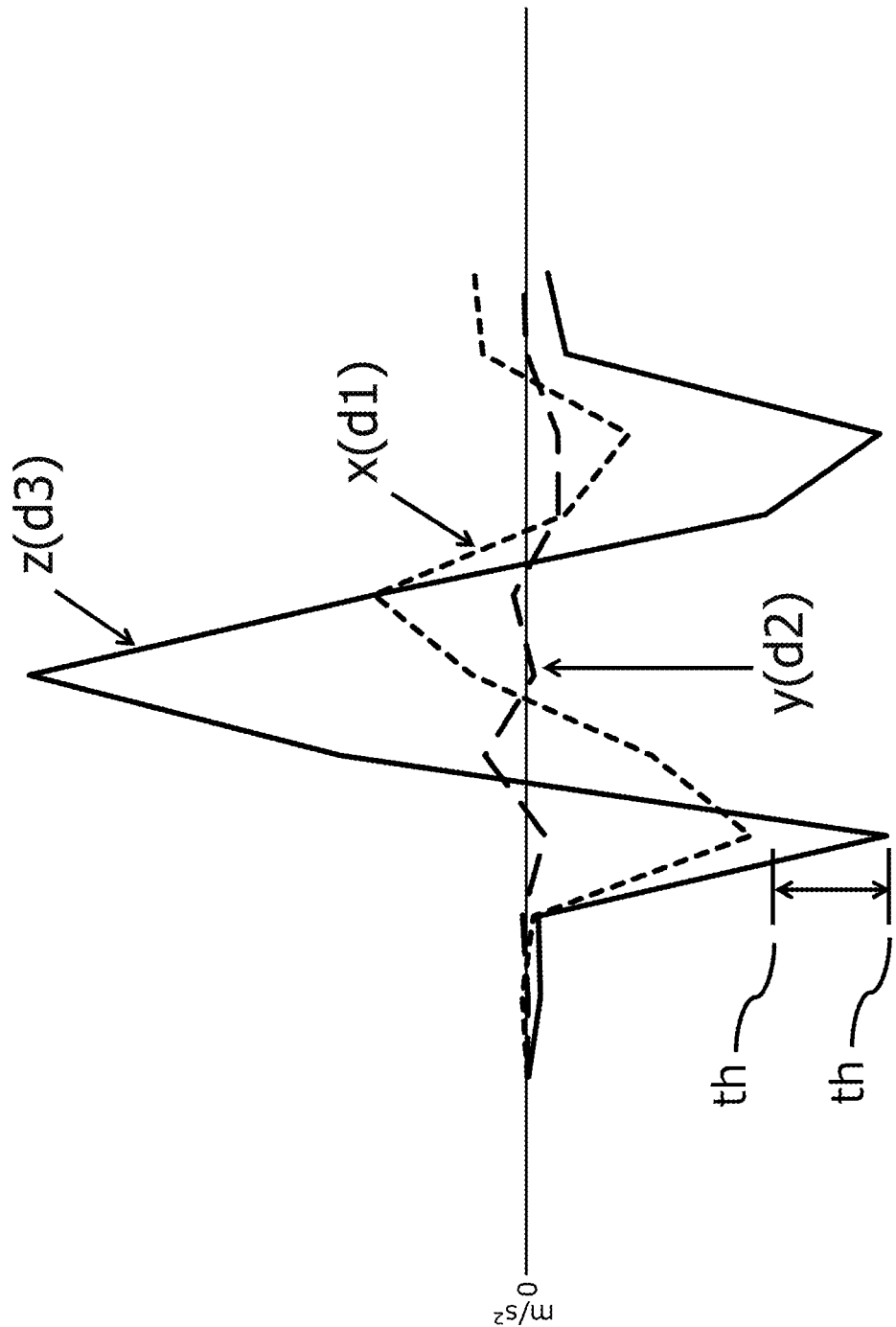
FIG. 12 is a diagram indicating acceleration in three axial directions when a gesture corresponding to reproduction is performed.
Figure 13:
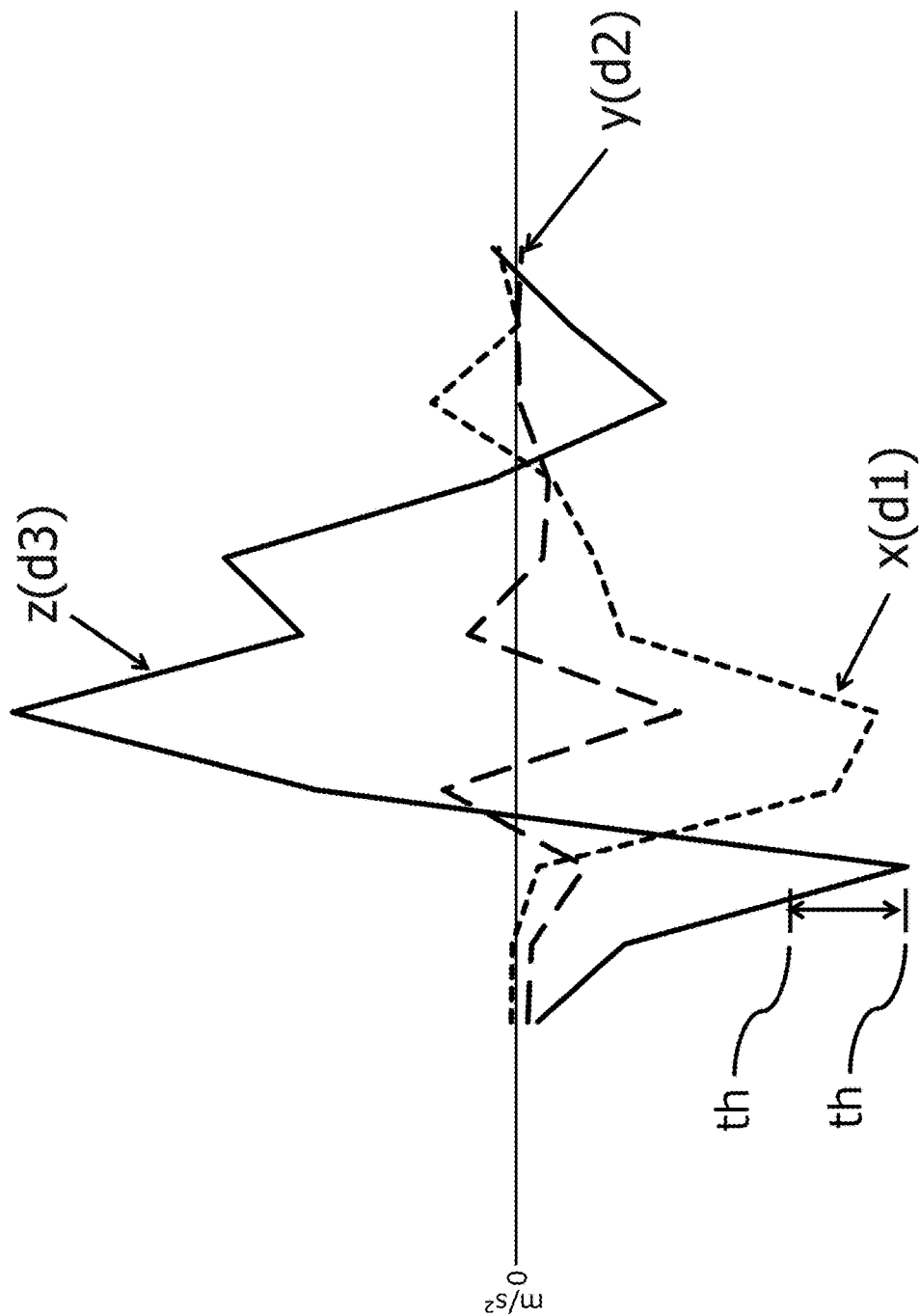
FIG. 13 is a diagram indicating acceleration in three axial directions when a gesture corresponding to stopping is performed.
Figure 14:
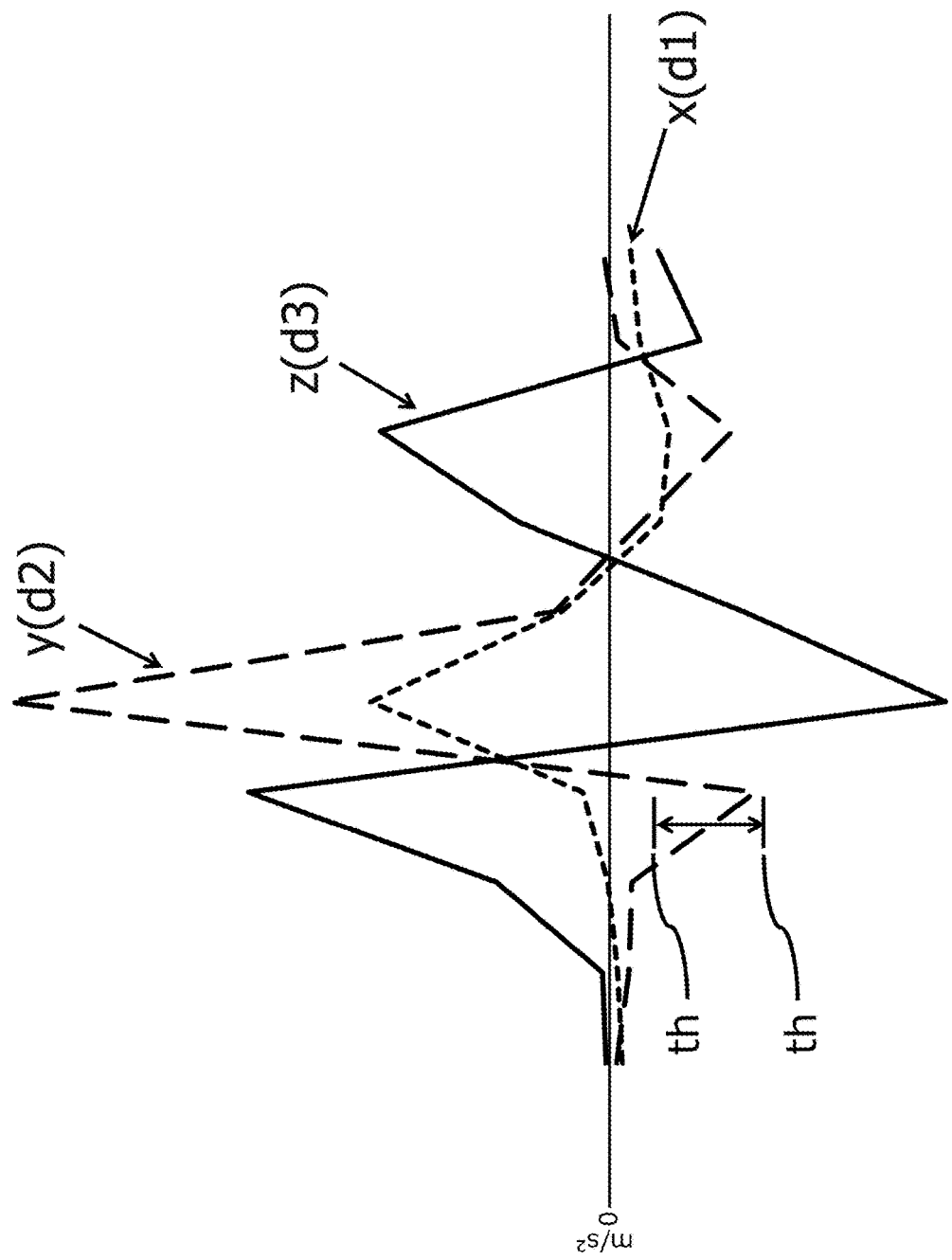
FIG. 14 is a diagram indicating acceleration in three axial directions when a gesture corresponding to fast-forward is performed.
Figure 15:
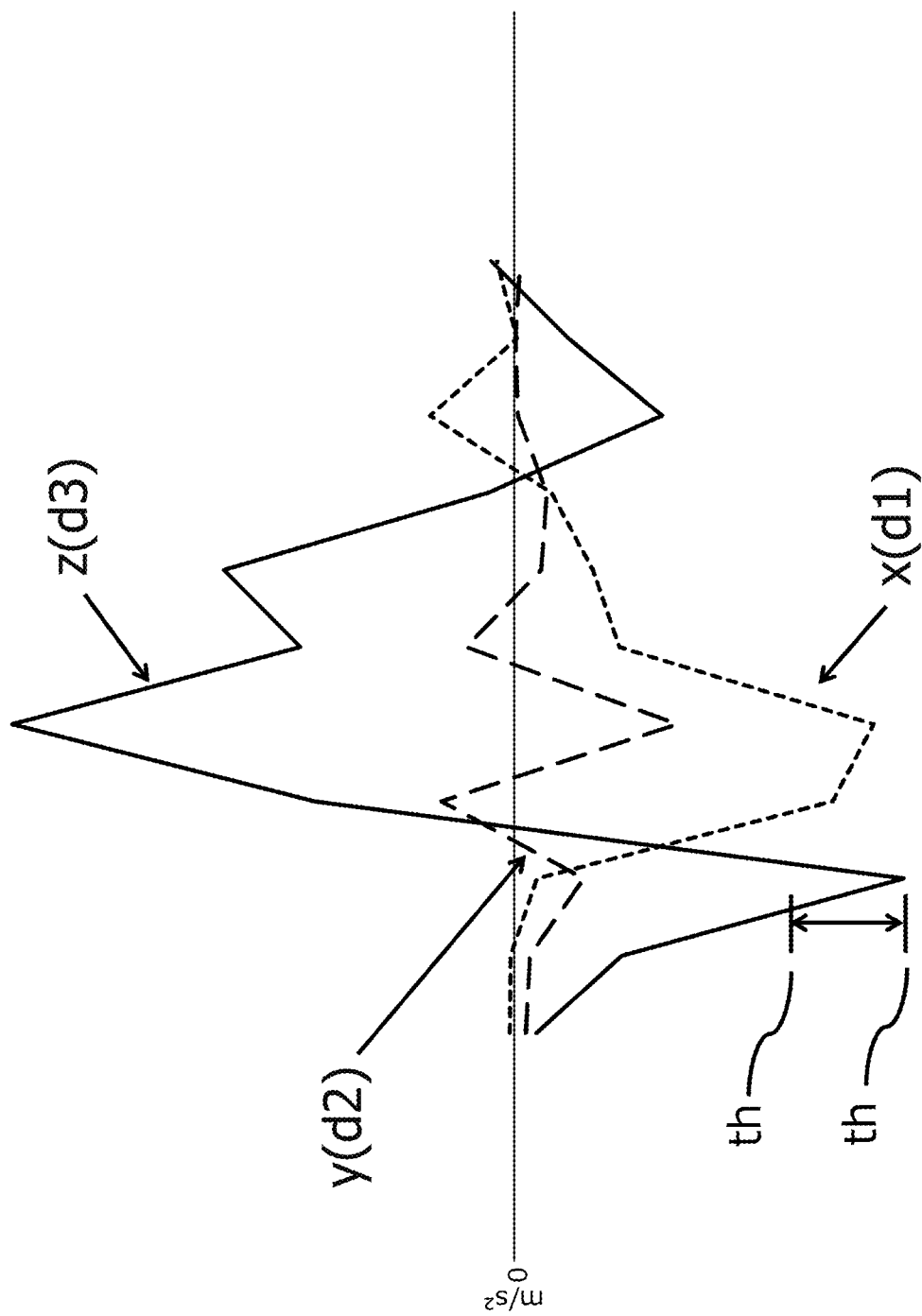
FIG. 15 is a diagram indicating acceleration in three axial directions when a gesture corresponding to rewind is performed.

Gesture: Tilt the upper edge once in the negative direction of the z-axis→Fast Forward Gesture: Tilt the lower edge once in the negative direction of the z-axis→Rewind FIG. 12 is a diagram indicating acceleration in three axial directions when a gesture corresponding to Play is performed. FIG. 13 is a diagram indicating acceleration in three axial directions when a gesture corresponding to Stop is performed. FIG. 14 is a diagram indicating acceleration in three axial directions when a gesture corresponding to Fast Forward is performed. FIG. 15 is a diagram indicating acceleration in three axial directions when a gesture corresponding to Rewind is performed.

Three accelerations shown in FIGS. 12 to 15 have two features described in FIGS. 4 and 6. Therefore, the control unit 17 can detect each gesture corresponding to play, stop, fast-forward, and rewind by performing the above-described gesture detection processing.

Therefore, the control unit 17, referring to the table, at the time of message detection, when detecting that the right edge slopes once to the negative direction of the z-axis, read the frame images from the data storage unit 13, plays the video on the touch panel 15. When a gesture is detected during play of a moving images, the control unit 17 executes an operation corresponding to the tilted direction of the smartphone 1 in accordance with the table.

The smartphone 1 can execute multi-function play or scrolling by increasing the number of times of gesture detection per predetermined time. In this case, in the operation content table, various play functions (pause, frame forward reproduction, frame backward reproduction, and the like) specified by the number of times of gesture detection per predetermined time and the direction in which the smartphone 1 is inclined are described. Therefore, the control unit 17 may detect the number of times of gesture detection per predetermined time and the direction of inclination of the smartphone 1, respectively, and may execute a play function or scroll corresponding to the detected content in accordance with the operation content table.

(Similar Search) A very large number of frame images are stored in the data storage unit 13. However, it is very difficult for a user to locate information about objects in a frame image one by one and prepare such information for use at any time.

On the other hand, the smartphone 1 can access the frame image stored in the data storage unit 13 to perform similar image retrieval in the external server and can obtain information on the subject (object) photographed in the frame images. The control unit 17 of the smartphone 1 performs extraction processing of local images for extracting an object appearing in frame images as preprocessing for performing similar image search.

(Extraction of Local Images) The control unit 17 extracts local images from the target frame image in order to identify an object in the frame image. Here, the target image are a photograph (still image) obtained by the above-described processing, a frame image of a moving image, a frame image of a preview moving image, a frame image of a moving image at the time of a gesture operation of the user, or the like. The control unit 17 extracts local images from the target images using the reference cells.

Figure 16:
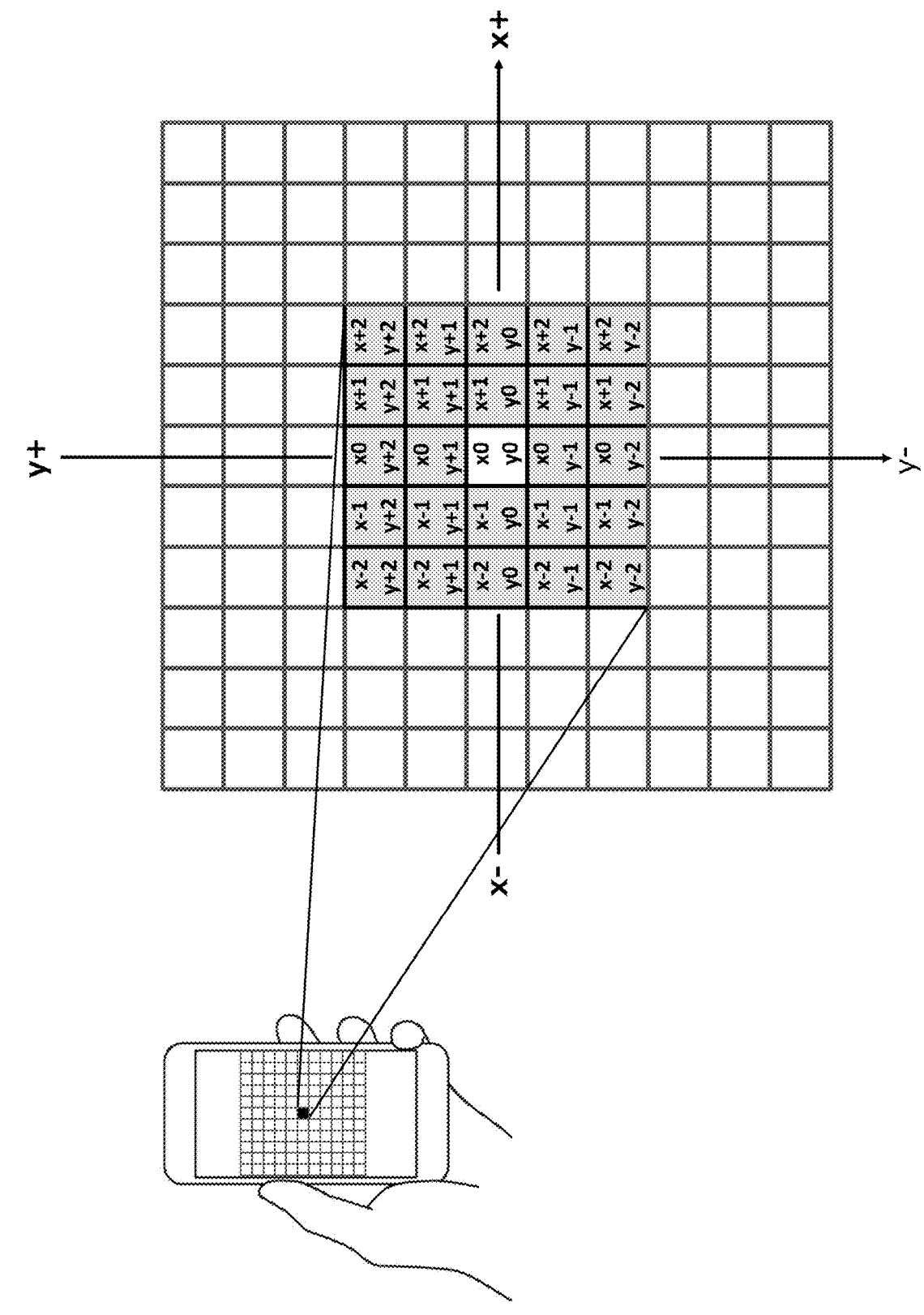
FIG. 16 is a diagram indicating a reference cell composed of 5×5 pixels.

FIG. 16 is a diagram indicating a reference cell composed of 5×5 pixels in the xy plane. Set the x-axis in the horizontal direction and the y-axis in the vertical direction of the target image. At the intersection of the x- and y-axes, the coordinates of the reference center pixel, which is the center pixel of the reference cell, shall be arranged, and the coordinates of the reference center pixel shall be (x0, y0).

At this time, with respect to the reference center pixel, two pixels adjacent in the x-direction and two pixels adjacent in the y-direction become adjacent pixels. For example, four pixels of (x−1, y0), (x+1, y0), (x0, y+1), and (x0, y−1) are adjacent to the reference center pixel (x0, y0).

Figure 17:
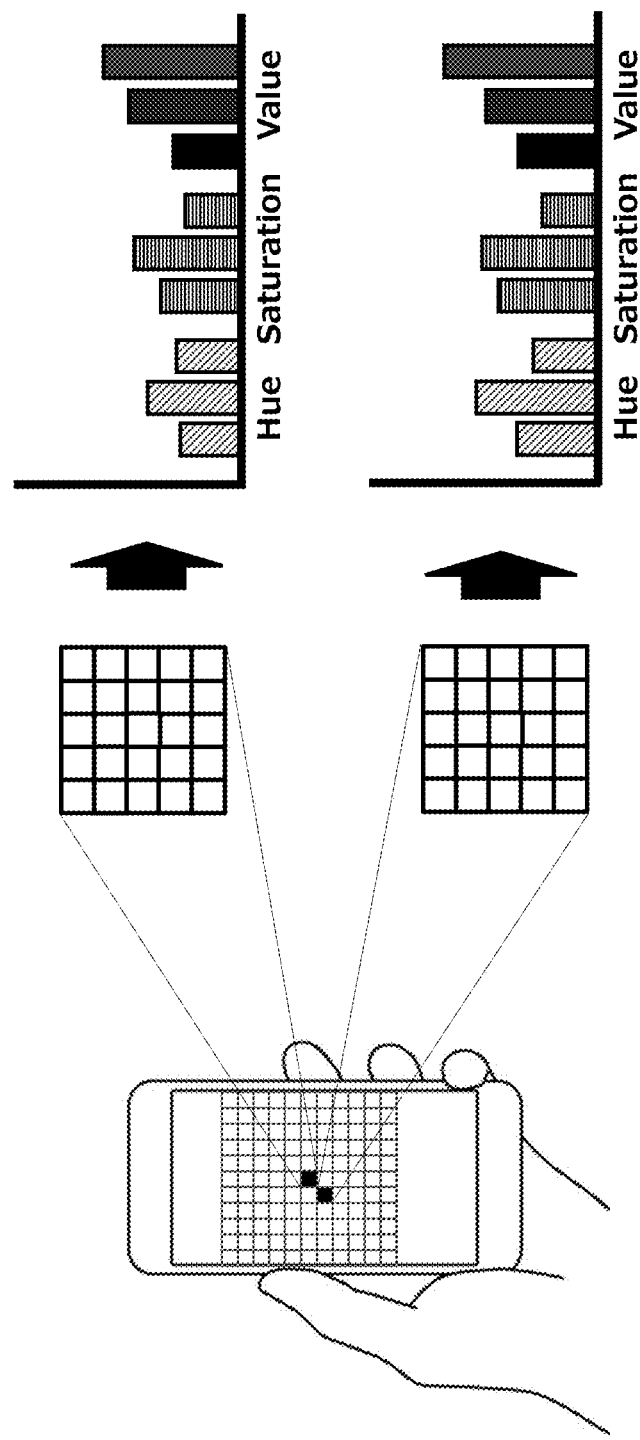
FIG. 17 is a diagram for explaining a method of determining the similarity between two reference cells.

FIG. 17 is a diagram for explaining a method of determining the similarity between two reference cells. The control unit 17 generates color histograms for red (R), green (G), and blue (B) in each region of two adjacent reference cells (HSV color space conversion) and determines the similarity between the two reference cells. The control unit 17 detects feature amounts of respective elements of hue, saturation, and lightness in the HSV color space for each of two adjacent reference cells and calculates a similarity value indicating a degree of similarity between the two reference cells.

The similarity value becomes zero when the two comparison objects are completely the same and becomes larger as the deviation of the comparison object becomes larger. When the similarity value is less than the threshold value, the control unit 17 determines that two adjacent reference cells are similar to each other and connects the two reference cells.

In this manner, when two adjacent reference cells are similar to each other, the control unit 17 successively connects the two reference cells to group the reference cells, thereby extracting a local image.

(Procedure for Extracting Local Images) The control unit 17 extracts a local image from the frame image according to the following procedure.

(Procedure 1) The control unit 17 creates color histograms Chist={C(H, 1), C(H, 2). C(H, N), C(S, 1), C(S, 2). C(S, N), C(V, 1), C(V, 2). C(V, N)} in the respective reference cells in the frame images. Here, H, S, and V are elements of the HSV color space represented by hue (H), saturation (S), and lightness (V). N is the quantization number.

(Procedure 2) The control unit 17 calculates C(rε{H, S, V}, n) by calculating the following color histogram equation.

$$C(r, n) = \sum_{x=1}^{M}\sum_{y=1}^{M} \delta[f(P_c(x, y, r), n)] \qquad \text{[Equation 1]}$$

M is the size (pixel) of the reference cell. n is the number of quantization n=(1, 2, . . . , N). f(Pc(x, y, r)) is a value obtained by quantizing Pc(x, y, r). Thus, C(r,n) is the cumulative value of the colors Pc(x,y,H), Pc(x,y,S), and Pc(x,y,V) for each pixel in the reference cell.

(Procedure 3) The control unit 17 calculates the similarity S(i, j) for the cell i, j by calculating the next histogram intersection equation using the color histograms calculated in the procedures (1) and (2).

$$S(i, j) = \frac{\sum_{b=1}^{B} \min(C_{hist}^{(i)}[b], C_{hist}^{(j)}[b])}{\sum_{b=1}^{B} C_{hist}^{(i)}[b]}$$ [Equation 2]

Note that B is the number of bins in the color histogram. When each similarity (approximation value) of two adjacent reference cells falls within a predetermined range, the control unit 17 connects the adjacent reference cells as approximation pixels. The control unit 17 groups the reference cells by successively connecting adjacent reference cells and determines the grouped reference cells as local images.

Note that the method of extracting the local image is not limited to the above-described embodiment, and various methods can be used. For example, a local image may be extracted by extracting a local feature amount for capturing a shape of an object or detecting an edge of an object.

Figure 18:
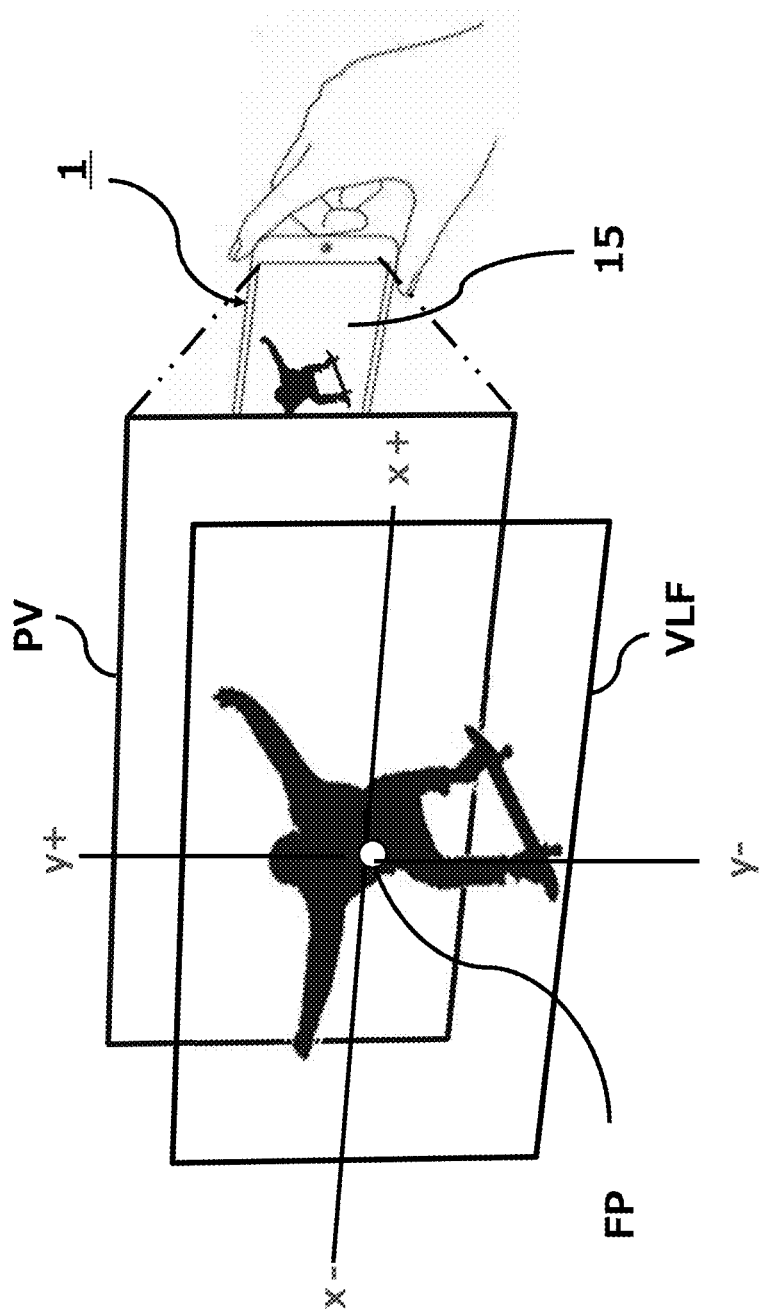
FIG. 18 is a diagram illustrating a virtual layer file associated with a frame image.

(Virtual Layer File Configuration) FIG. 18 is a diagram illustrating a virtual layer file VLF associated with a frame image (preview image PV). The control unit 17 generates a virtual layer file VLF for each frame image. A virtual layer file VLF is a file that contains information related to the corresponding frame image. A single virtual layer file VLF is associated with the frame image (T' sync).

The layer file number is assigned to the virtual layer file. In the virtual layer file, the xy coordinates indicating the region of the local image extracted from the corresponding frame image and the center position thereof, and the xy coordinates (x0, y0) of the focus point FP of the local image are described.

The xy coordinates indicating the region of the local image and the center position thereof are calculated by the control unit 17 at the time of extraction processing of the local image. The focus point FP uses the information generated when the subject is photographed.

In the virtual layer file VLF, the image feature amount (histogram or the like) of the corresponding frame image, the detection value of each of the three-axis directions of the sensor 14, and the synchronization time T' with the corresponding frame image (time with the corresponding frame) are described.

Further, in the virtual layer file, GPS position information indicating the location where the corresponding frame image was photographed, and photographing information relating to the frame image are described. The virtual layer file automatically describes the various information described above in synchronization with the corresponding frame image. The user may manually write the information described above to the virtual layer file.

The control unit 17 can recognize and track the center position of the local image by continuously reading the virtual layer file as necessary. In the present embodiment, all of the information related to the frame image is described in the virtual layer file, but the present invention is not limited to this. That is, some of the information about the frame image may be described in a file different from the virtual layer file or may be described and stored in a server on the communication network.

Figure 19:
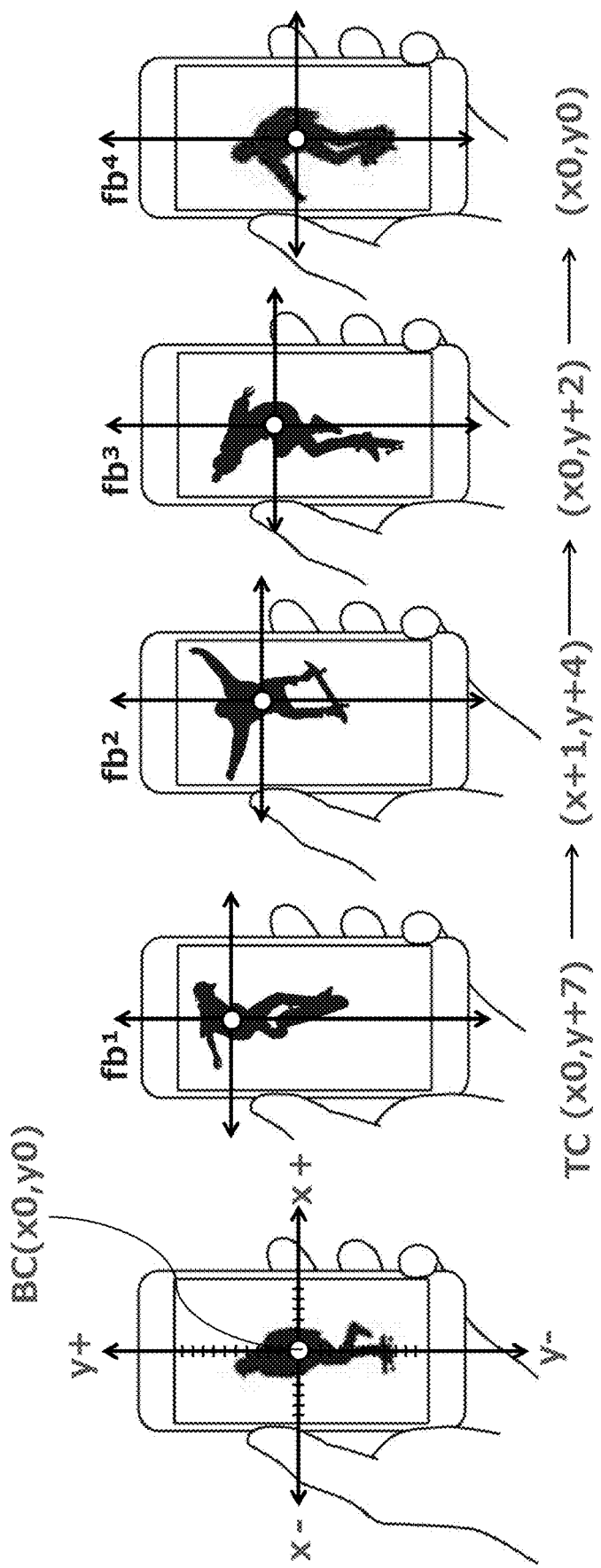
FIG. 19 is a diagram for explaining a situation in which an object in a frame image is tracked.

FIG. 19 is a diagram for explaining a situation in which an object in a frame image is tracked. When tracking an object, i.e., a local image, the control unit 17 uses the focus point of the virtual layer file synchronized with the local image as position information.

First, the control unit 17 reads out a frame image including a local image from the data storage unit 13, and also reads out a virtual layer file synchronized with the frame image. The control unit 17 acquires the basic coordinates BC(x0, y0) as the focus point (position information) FP of the object to be tracked from the virtual layer file.

Then, each time the frame image is read from the data storage unit 13, the control unit 17 also reads out the virtual layer file to be synchronized, and sequentially reads the focus point from the virtual layer file to acquire the tracking coordinates TC (x0, y+7), (x+1, y+4), (x0, y+2), and (x, 0). The tracking information may be described in a virtual layer file or may be stored in a data storage unit 13 or an external server in the smartphone 1.

(Storage and Management of Information) The control unit 17 stores the respective detected values in the three axial directions of the sensor 14, the change amount, the time change pattern, the feature amount such as the angle and the inclination direction in the data storage unit 13. In addition, the control unit 17 stores, in the data storage unit 13, RGB color histogram information, gray scale conversion information, positional information of an object appearing in the local image for each time, two-dimensional xy-axis coordinates representing an object region of the local image, and three-dimensional xy-axis coordinates which are focus point data for the object, for all the frame images. Further, the control unit 17 stores the photographing information, the GPS position information, the object tracking information of the local image, and the like when the object is photographed in the data storage unit 13.

The control unit 17 may store the above-described various types of information in the virtual layer file or may store the information in the frame image. In addition, the control unit 17 may store the above-described various information in the external server via the communication network instead of storing the information in the data storage unit 13 inside the smartphone 1.

(Display of local image) When detecting a tap on an object (local image) displayed on the touch panel 15, the control unit 17 reads information related to the object (local image) from the data storage unit 13 and displays the read information on the touch panel 15.

The data storage unit 13 may store high-quality image data of the local image in advance. In this case, when the control unit 17 detects the tap to the local image displayed on the touch panel 15, it may read the high-quality data from the data storage unit 13 and display the high-resolution image (for example, a 4K/8K or the like) of the tapped local image on the touch panel 15.

Figure 20:
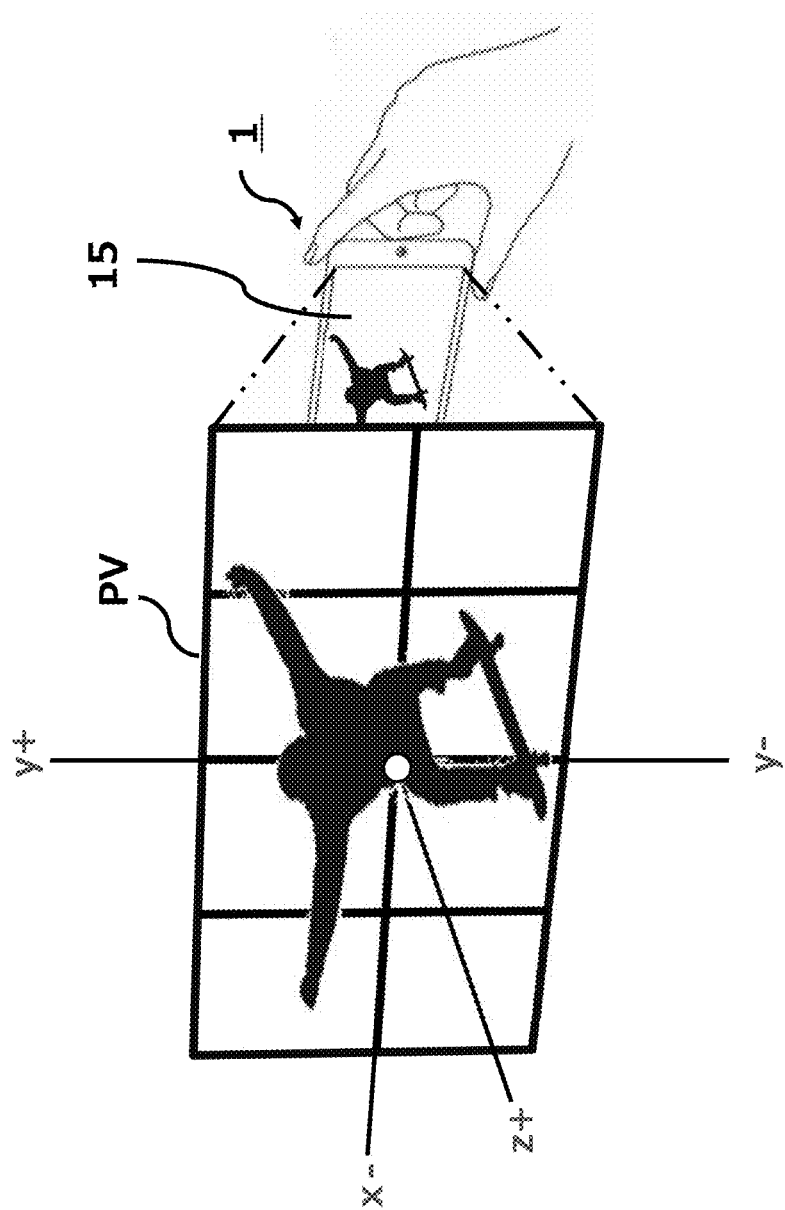
FIG. 20 is a diagram indicating a situation in which a high-resolution image is displayed as a preview image.

FIG. 20 is a diagram indicating a situation in which a high-resolution image is displayed as the preview image PV. When the preview image PV is a high-resolution image, the control unit 17 can divide the preview image PV into, e.g., eight, and extract a local image for each of the divided high-resolution images. Incidentally, the preview image PV is not limited to the case of being divided into 8, it may be divided into 4.

Figure 21A:
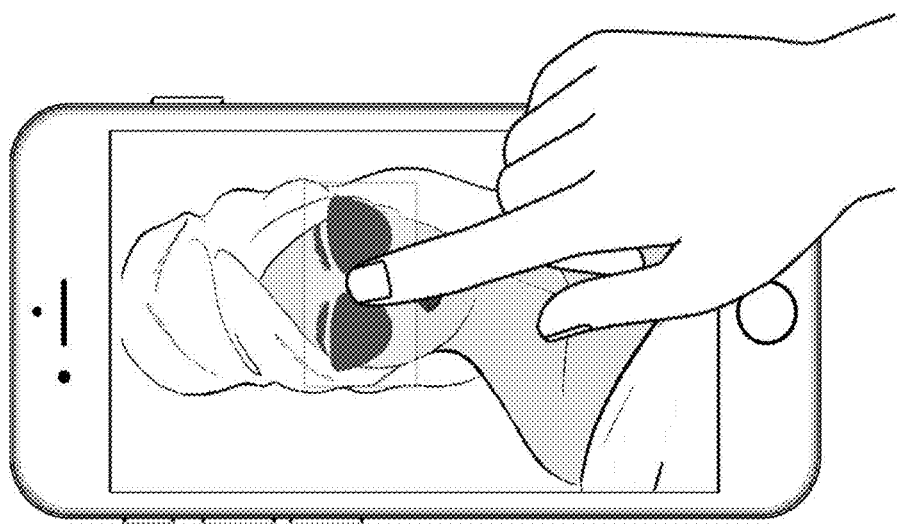
FIG. 21A is a diagram indicating tapped local images.

FIG. 21A is a diagram indicating tapped local images. The control unit 17 displays the enlarged image of the tapped local image and the similarity search result of the local image on the touch panel 15. For example, when a sunglass of a person displayed on the touch panel 15 is tapped, the control unit 17 displays an enlarged image of the tapped sunglass on the touch panel 15.

The control unit 17 further instructs the external server to search for a similar image of the tapped sunglass. When the external server searches the database for similar images similar to the sunglass, it transmits similar sunglass images and related information to the smartphone 1.

Figure 21B:
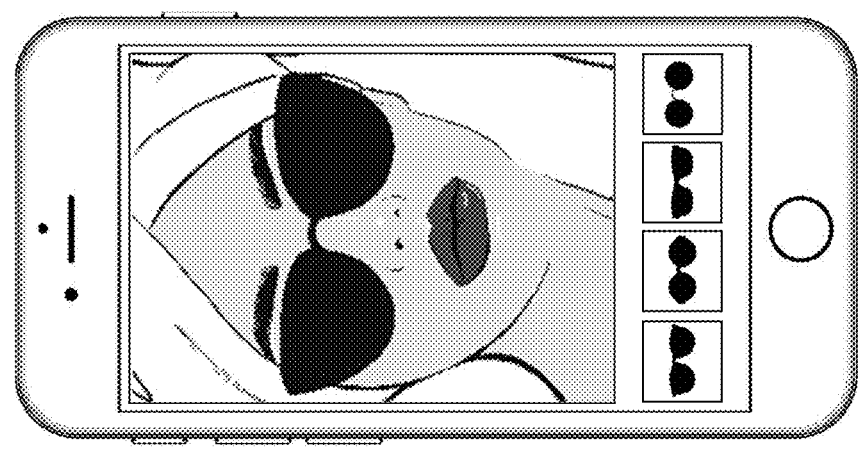
FIG. 21B is a diagram indicating a result of searching for similar images of sunglasses.

FIG. 21B is a diagram indicating a result of searching for similar images of sunglasses. The control unit 17 can display not only an enlarged image of the sunglasses but also images and related information of a plurality of sunglasses similar to the sunglasses on the touch panel 15. Here, the user can enter and edit information about the sunglass.

Figure 21C:
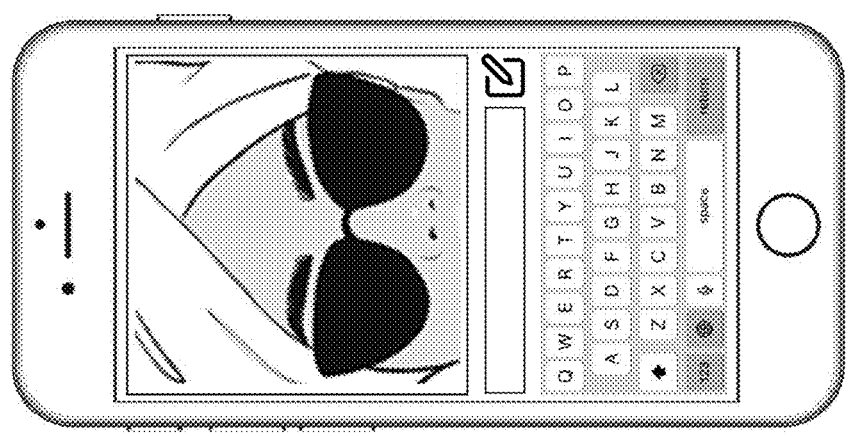
FIG. 21C is a diagram indicating a user editing window.

FIG. 21C is a diagram indicating a user editing window: The user can input arbitrary information on the sunglasses by operating the editing screen displayed on the touch panel 15. The control unit 17 stores the information input by the user in the data storage unit 13 or the external server, and can read out when necessary.

(Information synchronized with the frame image) The control unit 17 not only extracts a local image from the frame image, but also synchronizes various pieces of information with respect to all the frame images. Specifically, the control unit 17 assigns the frame number and the time information as the image feature quantity to each of the single frame image by photographing, the continuous frame image by continuous photographing, and the continuous frame image of the movie shooting or the preview movie.

That is, frame number and time information are given to all frame images. The frame image generated by photographing or moving image capturing is stored in the data storage unit together with the frame number and the time information. Frame number and time information stored in the data storage unit 13 is used for extracting and managing the frame image.

Figure 22:
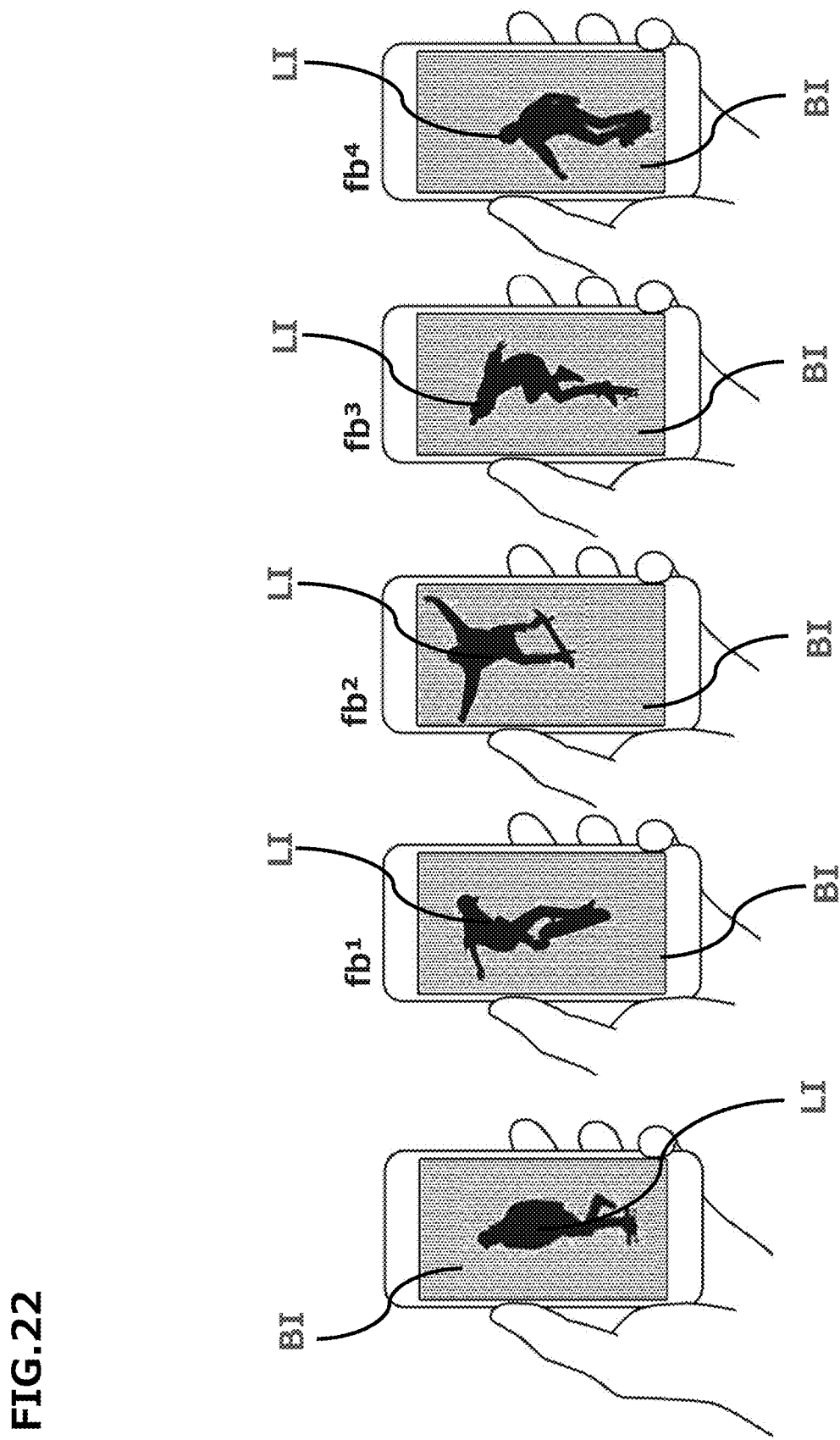
FIG. 22 is a diagram indicating a local image displayed on the background image.

(Local and Background Images) FIG. 22 is a diagram indicating the local image LI displayed on the background image BI. After extracting the local image LI for each frame image, the control unit 17 can distinguish the local image LI from the background image BI (frame images other than the local image LI) and store them in the data storage unit 13 or an external server. Further, the control unit 17 may store the image information relating to the local image LI or the background image BI, the feature amount of the local image LI, and the like in the data storage unit 13 or the external server.

The control unit 17 may distinguish the moving local image LI from the moving background image BI. At the time of reproduction, the control unit 17 reads out the local image LI and the background image BI from the data storage unit 13 or the like on the basis of the feature amount, for example, and overwrites the local image LI on the background image BI. The control unit 17 displays a local image LI or an enlarged image thereof on the touch panel 15.

(Preview image display and local image extraction) The control unit 17 may extract the local image from the frame image of the preview image while displaying the preview image on the touch panel 15. In addition, the control unit 17 may temporarily store the preview image in the data storage unit 13, then read the frame image of the preview image from the data storage unit 13, and extract the local image from the frame image.

(Display Correction according to Tilt) When displaying the preview image or the reproduced image on the touch panel 15, the control unit 17 can adjust the display image in accordance with the vibration or the inclination of the smartphone 1. Specifically, the control unit 17 determines in which direction and how much the smartphone 1 is inclined, based on the respective detection values in the three axial directions from the sensor 14.

Then, the control unit 17 configures a virtual display device in which the display screen becomes horizontal in the touch panel 15 on the basis of the above-described determination result. As a result, the user can view the image without being affected by the vibration or the inclination of the smartphone 1.

(Reduced Or Enlarged Image According To The Distance To The Subject) It is also possible to display a reduced image or an enlarged image in accordance with the distance from the smartphone 1 to the subject. Specifically; the control unit 17, using the focal length f and the aperture value x in the image capture unit 11, obtains the distance a from the smartphone 1 (imaging lens) to the subject (user itself in FIG. 24). The calculation method of the distance a is not particularly limited, and a known technique can be used. The control unit 17, according to the determined distance a, the preview image, a reproduced image is an image after shooting (e.g., a still image or a moving image) can be reduced or enlarged and displayed on the touch panel 15.

Figure 23:
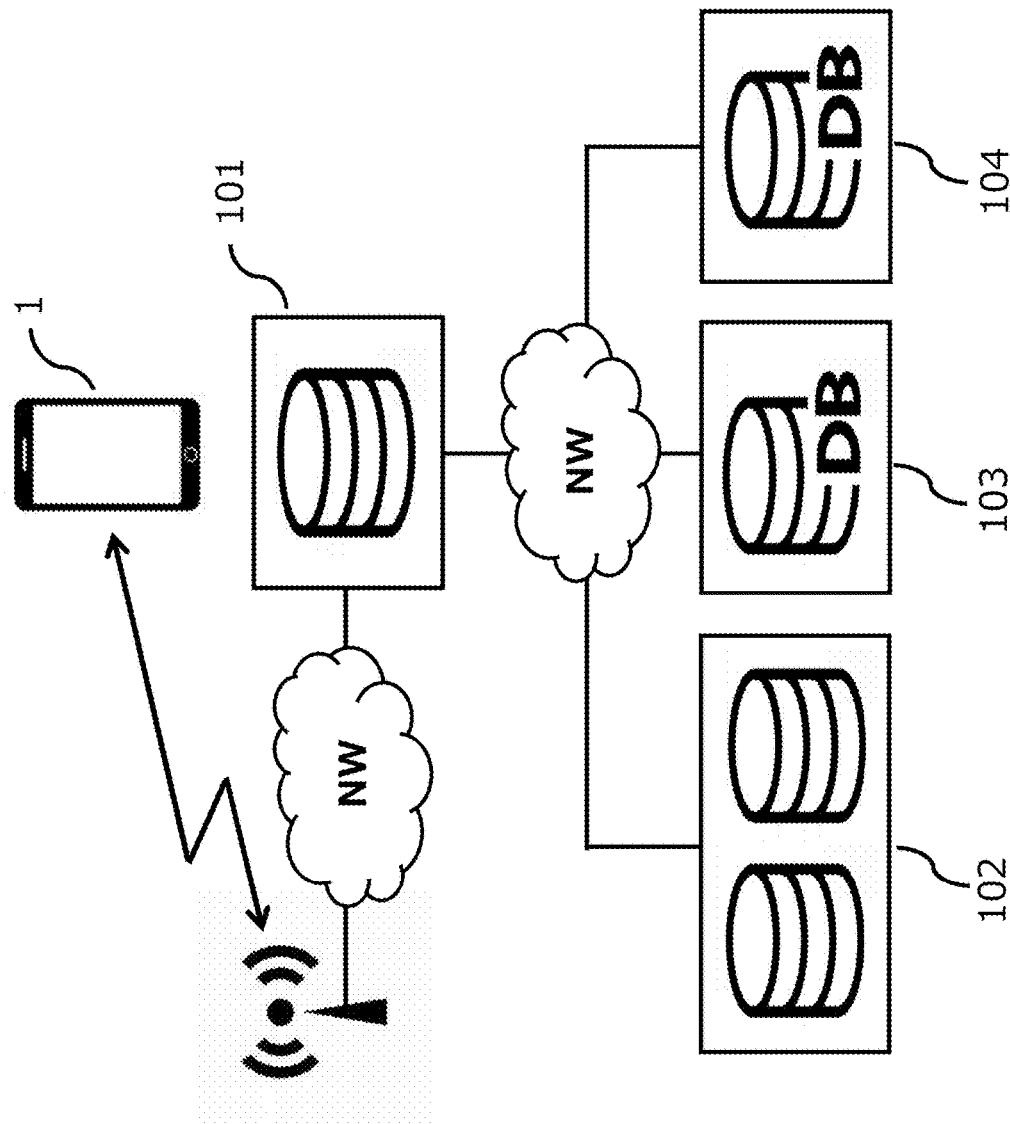
FIG. 23 is a diagram illustrating a communication network of a smartphone.

(Communication network configuration example) FIG. 23 is a diagram illustrating a communication network of the smartphone 1. The smartphone 1 is connected to various external servers via the network NW. The external server includes, for example, a communication carrier server 101, a cloud server 102, an image database server 103, and an image database server 104 for an operator. These servers store data used in the smartphone 1 and various data related to the data.

Figure 24:
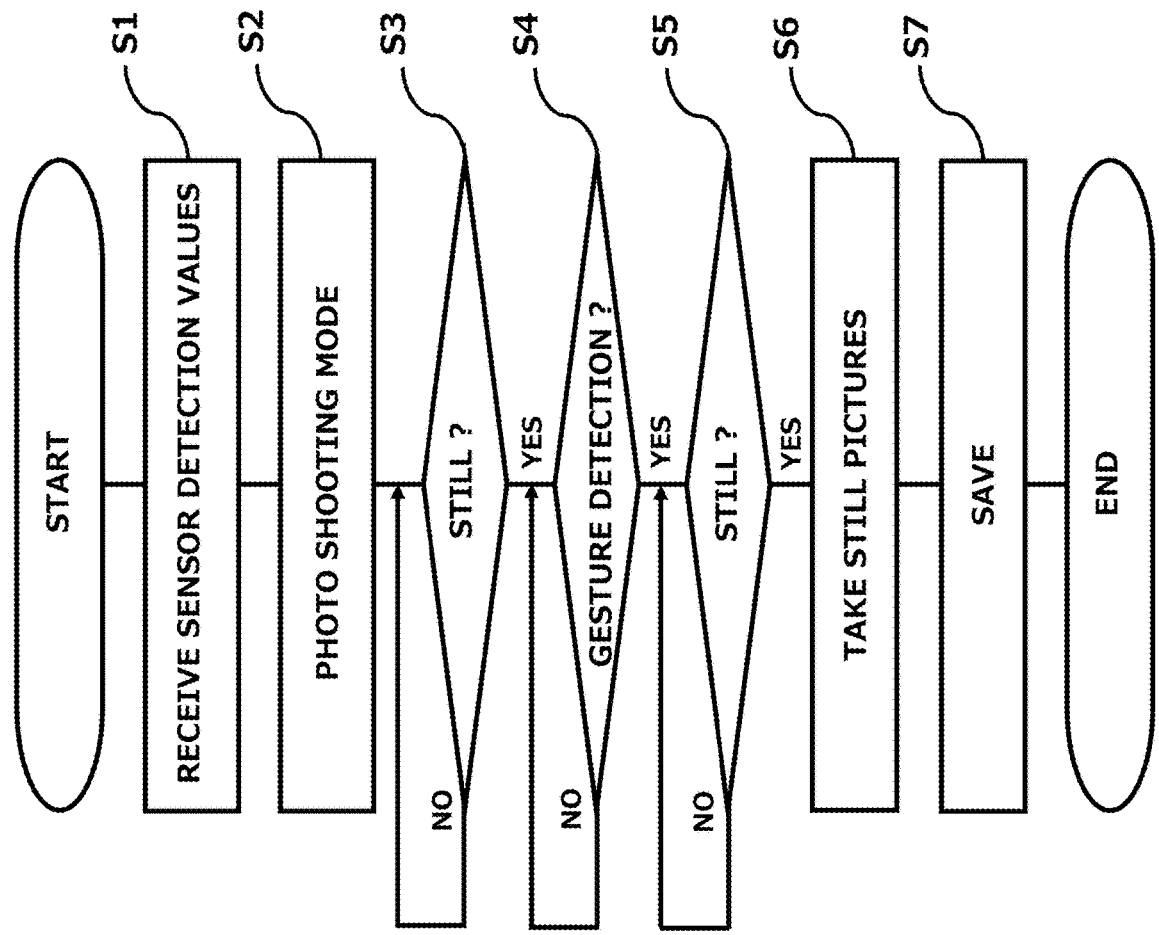
FIG. 24 is a flowchart indicating a photographing processing routine of the control unit.

FIG. 24 is a flowchart indicating a photographing processing routine of the control unit 17. The control unit 17 selects an optimum frame image as a still image from among the plurality of frame images generated by the image capture unit 11 according to the next photographing processing routine. In the following steps, since the processing already described is performed, details thereof will be omitted.

The control unit 17 receives the respective detected values in the three axial directions from the sensor 14 when the camera function is activated (step S1). The control unit 17 shifts to the photographing mode by the user's operation (Step S2), and displays the frame image generated by the image capture unit 11 as a preview image on the touch panel 15.

In step S3, the control unit 17 determines whether or not the smartphone 1 is still by performing the above-described still state determination using the three detection values of the sensor 14. The control unit 17 waits in step S3 until it is determined that the smartphone 1 is still, and when it is determined that the smartphone 1 is still, the process proceeds to the next step S4.

In step S4, the control unit 17 performs the above-described gesture detection process using the three detection values of the sensor 14. The control unit 17 waits in step S4 until a gesture is detected, and when the gesture is detected, the process proceeds to the next step S5.

In step S5, the control unit 17 determines whether the smartphone 1 has rested. When it is determined that the smartphone 1 is still, the control unit 17 proceeds to the next step S6. Incidentally, the control unit 17 waits in step S5 until it is determined that the smartphone 1 is still, but when a predetermined time (for example, 5 seconds) has elapsed from the time of gesture detection, the process automatically proceeds to the next step S6.

In step S6, the control unit 17 selects an optimal frame image as a still image from the frame images corresponding to the still period among the plurality of frame images stored in the data storage unit 13 for still image shooting. The method of selecting a frame image optimum as a still image is as described above, and is not particularly limited. In step S7, the control unit 17 stores the frame image selected in step S6 in the data storage unit 13 or the external server.

In FIG. 24, the control unit 17 executes all of the steps S3 to S5, but it is not necessary to execute all of the steps S3 to S5, and the step S3 or S5 may be omitted. For example, the control unit 17 may omit step S5 and select a still image from a plurality of frame images in a still period before the gesture detection. In addition, the control unit 17 may omit step S3 and select a still image from a plurality of frame images in a still period after the gesture detection.

Figure 25:
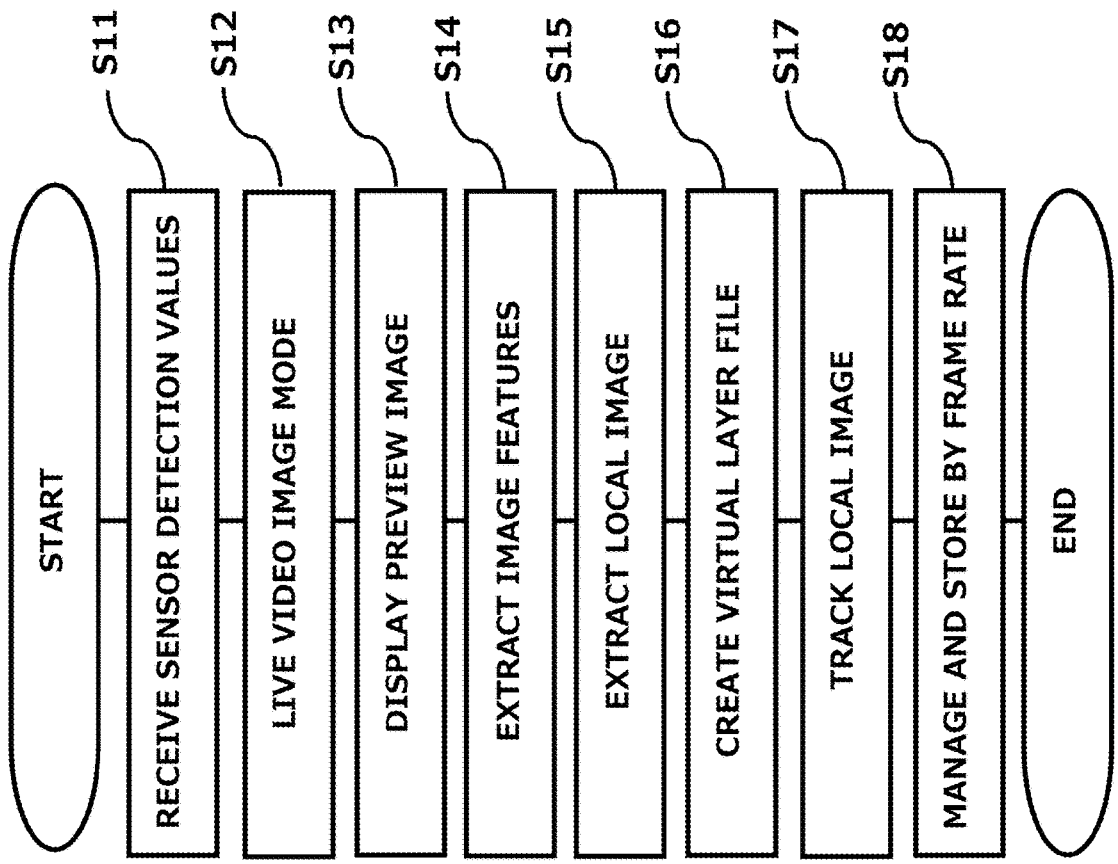
FIG. 25 is a flowchart indicating a local image extraction routine.

FIG. 25 is a flowchart indicating a local image extraction routine. The control unit 17 extracts a local image from the frame image in accordance with the next local image extraction routine. In each of the following steps, since the process described above is performed, the details will be omitted.

The control unit 17 receives the respective detected values in the three axial directions from the sensor 14 when the camera function is activated (step S11). The control unit 17 shifts to the live moving image mode by the user's operation (step S12), and displays the frame image generated by the image capture unit 11 on the touch panel 15 as a preview image (step S13). The image displayed on the touch panel 15 is not limited to the preview image in the live moving image mode, and may be a frame image read from the data storage unit 13.

The control unit 17 extracts the image feature amount from the frame image of the display image (step S14), and further extracts the local image from the frame image (step S15). In step S16, the control unit 17 creates a virtual layer file to be T' synchronized with the frame image including the local image, and describes the various information in the virtual layer file.

For example, the control unit 17 sets the xy coordinate at the center position of the pixel constituting the local image, sets the xy coordinate of the focus point in the local image, and describes these pieces of setting information in the virtual layer file. In step S17, the control unit 17 uses the focus point of the virtual layer file as position information to track the local image. In step S18, the control unit 17 manages and stores the processing described above for each frame rate.

Figure 26:
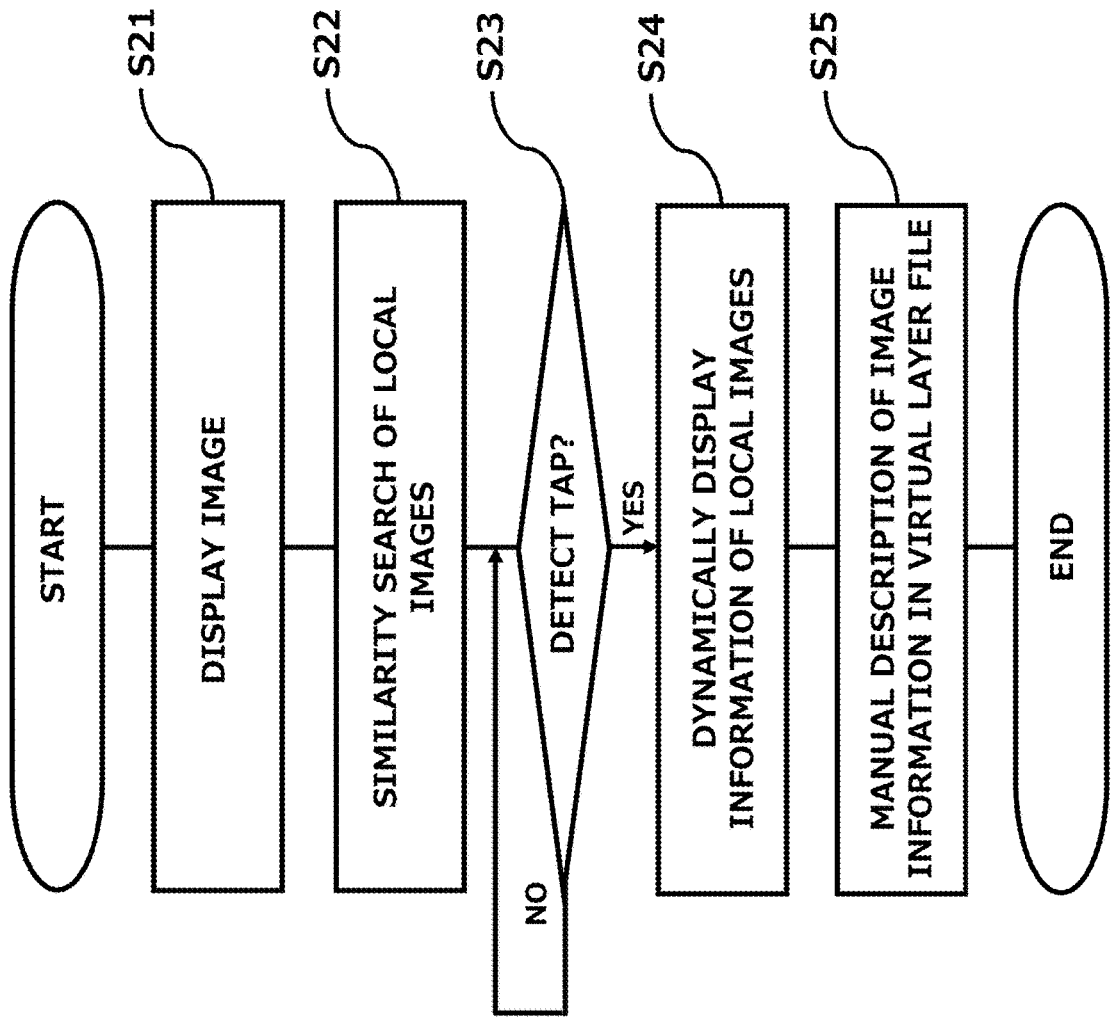
FIG. 26 is a flowchart indicating a similarity search routine for local images.

FIG. 26 is a flowchart indicating a similarity search routine for local images. The control unit 17 searches for information on the local image in accordance with the similarity search routine of the next local image, and displays the information on the touch panel 15. In each of the following steps, since the process described above is performed, the details will be omitted.

The control unit 17 displays an image on the touch panel 15 (Step S21). The image displayed on the touch panel 15 may be a preview image or a frame image read from the data storage unit 13.

In step S22, the control unit 17 instructs the image database shown in FIG. 23, for example, to perform a similar search on the local images of all the images displayed on the touch panel 15. At this time, the image database searches for an image similar to the local image or information related to the local image, and transmits the image or information obtained by the search to the smartphone 1.

The control unit 17 of the smartphone 1, upon receiving the image or information obtained by the search, displays the image or information on the touch panel 15. As a result, the control unit 17 can search for an image similar to the local image (object) of the frame image at high speed.

The control unit 17 determines whether or not a tap to the local image displayed on the touch panel 15 has been detected (Step S23). The control unit 17 waits in step S23 until the tap is detected, and proceeds to the next step S24 when the tap is detected.

In step S24, the control unit 17 dynamically displays the information received from the image database on the touch panel 15 for the tapped local image. For example, when the local image indicates sunglasses, sunglasses similar to the sunglasses are displayed on the touch panel 15. At this time, the user can manually describe the image information in the virtual layer file. In step S25, the control unit 17 stores the virtual layer file in the data storage unit 13, an external server, or the like.

(Examples of Use of Other Information) By using the focus point as the position information of the object region of the local image (object), the control unit 17 can acquire not only the object but also the position information from the frame image, and display the object and the position information on the touch panel 15. Further, a specific object or the like can be tracked from the reproduced moving image or the live moving image (all frame images) displayed on the touch panel 15.

The control unit 17 can store, in the data storage unit 13, three detection values in three axial directions of the sensor 14, feature amounts such as a time change amount, a time change pattern, an angle and a tilt direction of each detection value, RGB color histogram information or gray scale conversion information of all frame images, and position information of a local image (object) on a time axis.

Further, the control unit 17 can store, in the data storage unit 13, data sets such as two-dimensional xy coordinates representing the object region of the local image, focus point data of three-dimensional xyz axis coordinates, shooting information, GPS position information, object tracking information of the local image, and the like.

Figure 27:
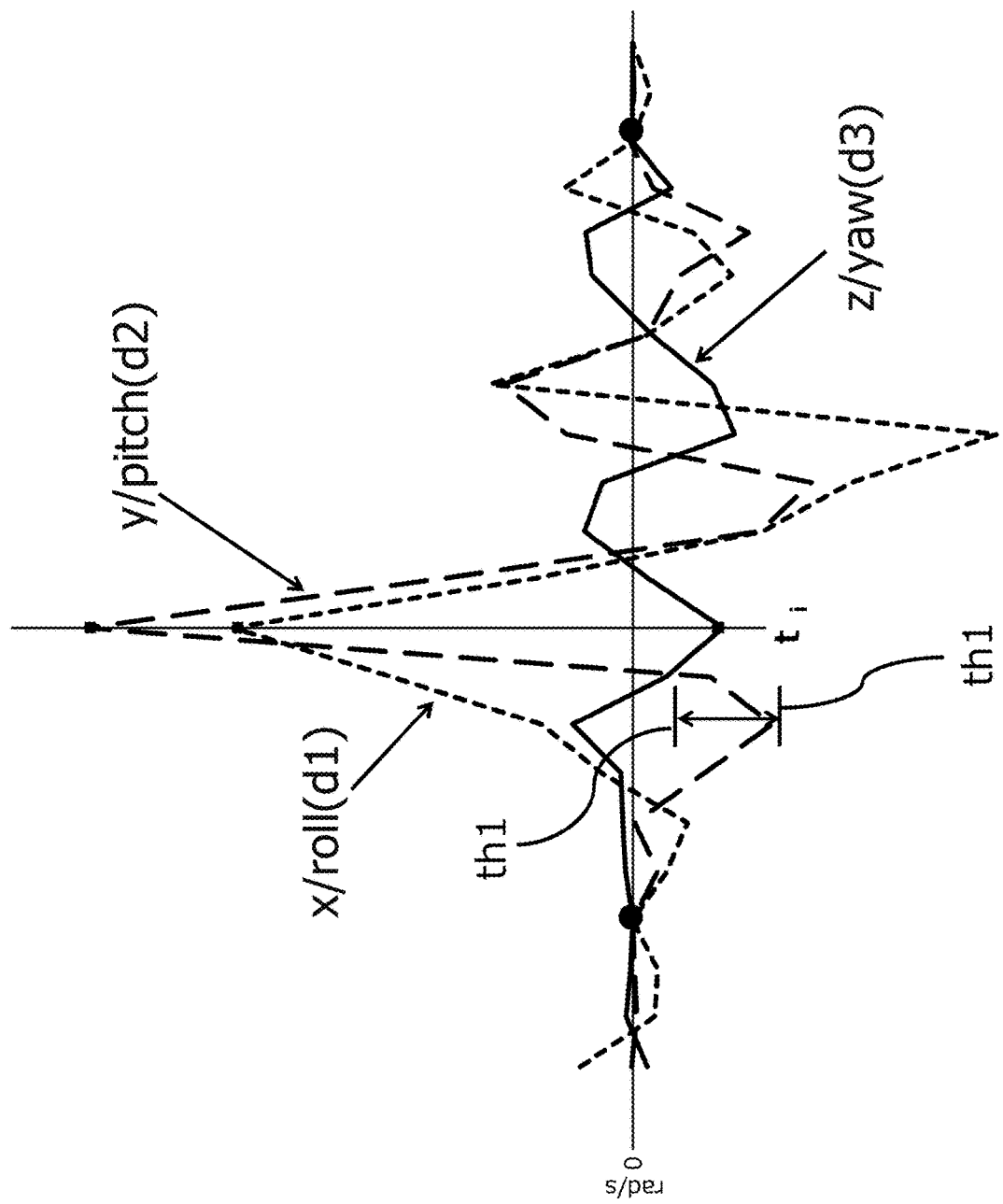
FIG. 27 is a diagram indicating changes in angular velocities in the three axial directions when a tap operation is performed to the smartphone.

The control unit 17 may cache the above-described data in a memory array, store the data in an image file or an overlaid virtual layer file, or store the data in an external server shown in FIG. 27. The control unit 17 can also read various data stored as described above as necessary, perform predetermined arithmetic processing, and display images and other methods on the touch panel 15.

As described above in detail, the smartphone 1 according to the present embodiment includes an image capture unit 11 for capturing an image of a subject, a sensor 14 for detecting a position in three axial directions or an amount related to the position, and a control unit 17 for controlling an operation and a reproduction function of the image capture unit 11 using at least one of three detection values output from the sensor 14. As a result, the smartphone 1 can control the operation of the image capture unit 11 and the reproduction function by the user performing a gesture operation to the smartphone.

The present invention is not limited to the above-described embodiments, and can be applied to a design modification within the scope of the matters described in the claims. The present invention can be applied to other than the smartphone 1, for example, to a portable terminal having no telephone function.

In the embodiments described above, the sensor 14 is an acceleration sensor, but the sensor 14 may be an angular velocity sensor (gyro sensor).

Figure 28:
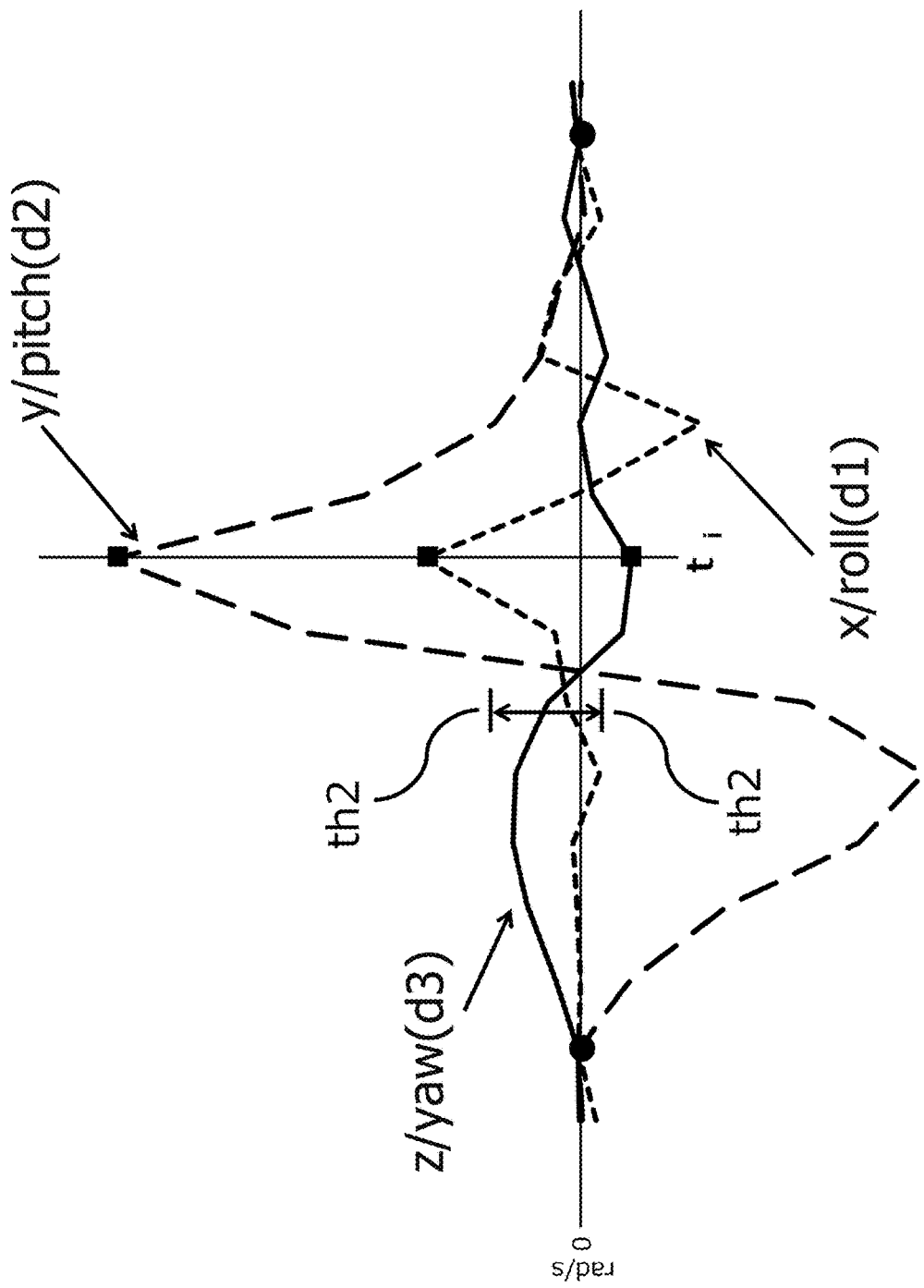
FIG. 28 is a diagram indicating changes in angular velocities in the three axial directions when a flip operation is performed to the smartphone.

FIG. 27 is a diagram indicating changes in angular velocities in the three axial directions when a tap operation is performed to the smartphone 1. FIG. 28 is a diagram indicating changes in angular velocities in three axial directions when the smartphone 1 is subjected to a flip operation. When tapping or flipping operations are performed when the smartphone 1 is in a still state, the respective angular velocities in the three axial directions have two features similar to those in the case of acceleration.

Figure 29:
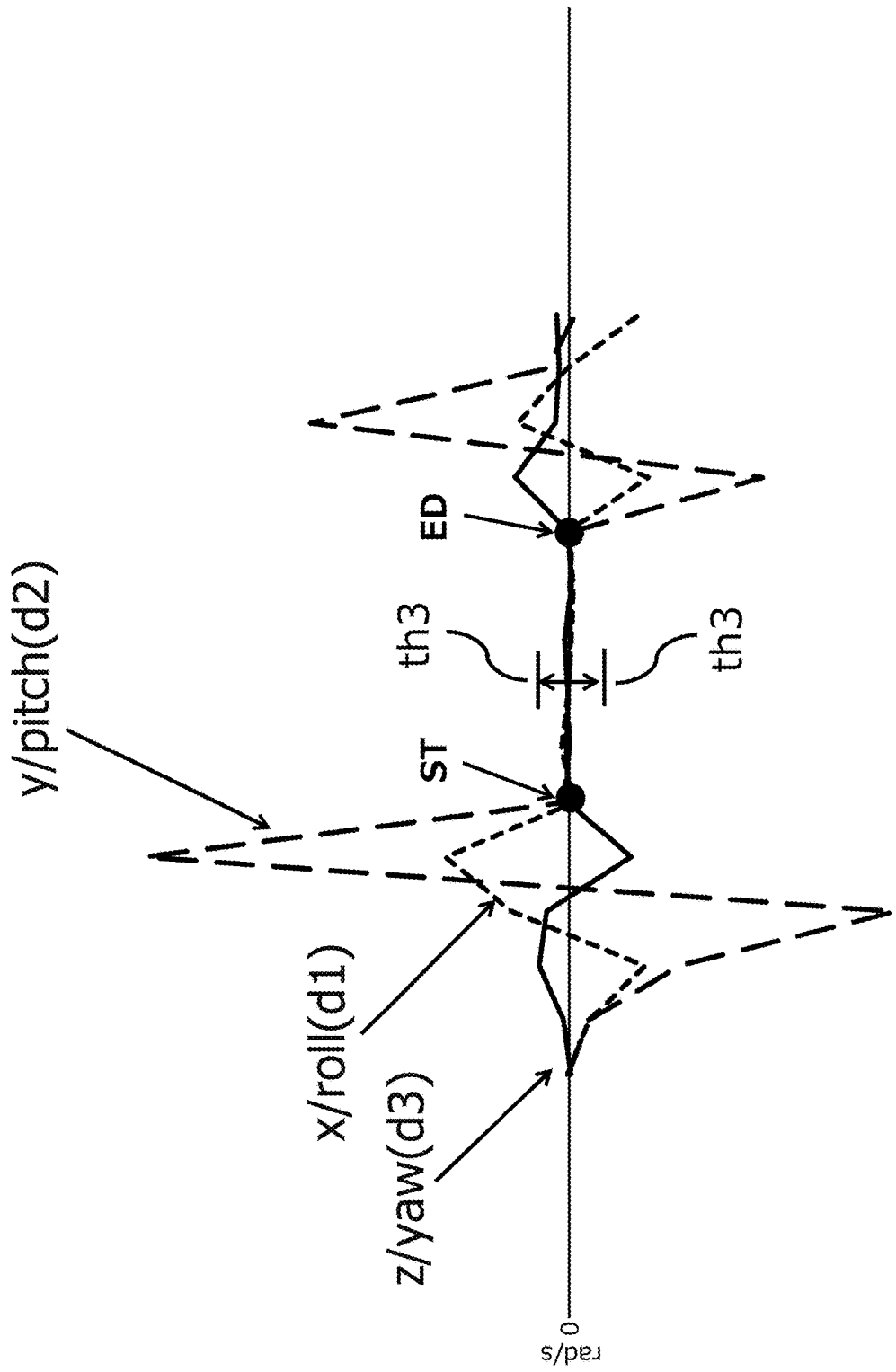
FIG. 29 is a diagram indicating a still start point and a still end point to be set in the determination of the still state using the angular velocity.

FIG. 29 is a diagram indicating a still start point and a still end point to be set in the determination of the still state using the angular velocity. In this case, the control unit 17 can set the still start point ST and the still end point ED by using, for example, Equation (1) described above. Incidentally, a of Equation (1) is the optimum value when using a gyro sensor as the sensor 14.

REFERENCE SIGNS LIST

1 smartphone
11 imaging unit
12 image processing unit
13 data storage unit
14 sensor
15 touch panel
16 communication unit
17 control unit

The invention claimed is:

1. A trigger signal generating apparatus for generating a trigger signal indicating a timing when a gesture is performed on a portable terminal, the trigger signal generating apparatus comprising:
a motion sensor for detecting motion information in each of three axial directions of a coordinate system having the portable terminal as an origin;
memory storing instructions; and
one or more processors that, with the instructions, configure the trigger signal generating apparatus to:
generate the trigger signal at a timing when a positive/negative sign of one of three pieces of motion information detected by the motion sensor becomes different from the remaining two positive/negative signs and when the three pieces of motion information respectively reach a peak substantially synchronously.

2. The trigger signal generating apparatus according to claim 1, configured to: generate the trigger signal at a timing when at least one of the three pieces of motion information detected by the motion sensor exceeds a threshold value and the positive/negative sign of one of the three pieces of motion information is different from the remaining two positive/negative signs.

3. The trigger signal generating apparatus according to claim 1, configured to: generate the trigger signal at a timing when at least one of absolute values of change amounts per time of each of the three pieces of motion information detected by the motion information detecting section exceeds a threshold value and the positive/negative sign of one of the three pieces of motion information is different from the remaining two positive/negative signs.

4. The trigger signal generating apparatus according to claim 1, wherein the motion sensor detects any one of speed, acceleration, angular velocity, angular acceleration, and geomagnetism as the motion information.

5. The trigger signal generating apparatus according to claim 1, further configured to:
control the function of the portable terminal based on the direction of the motion information detected by the motion sensor and the number of times of the trigger signal generated within a predetermined time.

6. A portable terminal comprising a motion sensor for detecting motion information in three axial directions of a coordinate system respectively,
an image sensor for capturing a subject and generating frame images,
an image memory for sequentially storing the frame images generated by the image sensor and one or more processors that configure the portable terminal to:
detect a still period when the portable terminal is in a still state based on three pieces of motion information detected by the motion sensor;
generate a trigger signal indicating a timing at which a gesture is performed when a positive/negative sign of one of the three pieces of motion information detected by the motion sensor becomes different from the remaining two positive/negative signs and when the three pieces of motion information respectively reach a peak substantially synchronously; and
select, as a still image, one frame image corresponding to the still period before or after a timing when the trigger signal is generated, from a plurality of frame images stored in the image memory.

7. The portable terminal according to claim 6, configured to: select, as the still image, one frame image corresponding to the remaining still period, excluding the still period which is separated from the timing of generation of the trigger signal by a predetermined time from the timing of generation of the trigger signal, among the still periods before or after the timing of generation of the trigger signal.

8. The portable terminal according to claim 6, further comprising:
a display for displaying a frame image generated by the image sensor and a display object having a three-dimensional shape, the portable terminal further configured to:
perform control for moving the display object displayed on the display in accordance with motion information in each of three axial directions detected by the motion sensor.

9. The portable terminal according to claim 6, further comprising a still image memory storing the frame image selected as the still image, the portable terminal further configured to:
extract a local image corresponding to the subject from the frame image stored in the still image memory;
request an external server to search for information related to the local image; and
display a search result returned from the external server.

10. The portable terminal according to claim 9, configured to:
display a similar image similar to the local image as information related to the local image.

11. The portable terminal according to claim 9, further configured to:
create a virtual layer file in which focus point information, when an image of the subject is captured using a focus function, is described as position information of the local image for each frame image; and
track the local image based on position information of the virtual layer file.

* * * * *